United States Patent
Cho et al.

(10) Patent No.: US 12,321,445 B2
(45) Date of Patent: Jun. 3, 2025

(54) METHOD AND APPARATUS WITH BIOMETRIC INFORMATION SPOOF DETECTION

(71) Applicant: Samsung Electronics Co., Ltd., Suwon-si (KR)

(72) Inventors: Sung-Jae Cho, Hwaseong-si (KR); Kyuhong Kim, Seoul (KR); Sungun Park, Suwon-si (KR); Jiwhan Kim, Seongnam-si (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 339 days.

(21) Appl. No.: 17/552,597

(22) Filed: Dec. 16, 2021

(65) Prior Publication Data

US 2022/0318376 A1   Oct. 6, 2022

(30) Foreign Application Priority Data

Mar. 31, 2021   (KR) .................. 10-2021-0041814
May 6, 2021     (KR) .................. 10-2021-0058817

(51) Int. Cl.
*G06F 21/55*   (2013.01)
*G06N 3/04*    (2023.01)
(Continued)

(52) U.S. Cl.
CPC .............. *G06F 21/55* (2013.01); *G06N 3/04* (2013.01); *G06N 7/01* (2023.01); *G06F 21/32* (2013.01);
(Continued)

(58) Field of Classification Search
CPC .. G06V 40/1312; G06V 40/172; G06T 7/337; G06N 7/01; G10L 17/08
See application file for complete search history.

(56) References Cited

U.S. PATENT DOCUMENTS

| | | | |
|---|---|---|---|
| 2016/0070966 A1* | 3/2016 | Yang | A61B 5/11 345/8 |
| 2016/0070968 A1* | 3/2016 | Gu | G06T 7/337 382/125 |

(Continued)

FOREIGN PATENT DOCUMENTS

| | | |
|---|---|---|
| KR | 10-1436786 B1 | 9/2014 |
| KR | 10-1704736 B1 | 2/2017 |

(Continued)

OTHER PUBLICATIONS

He, Kaiming, et al. "Deep Residual Learning for Image Recognition." Proceedings of the IEEE conference on computer vision and pattern recognition. 2016., 770-778.

(Continued)

*Primary Examiner* — Barbara B Anyan
(74) *Attorney, Agent, or Firm* — NSIP Law

(57) ABSTRACT

A method with biometric information spoof detection includes extracting an embedding vector from an intermediate layer of a neural network configured to detect whether biometric information of a user is spoofed from an image including the biometric information; detecting first information regarding whether the biometric information is spoofed, based on the embedding vector; and detecting second information regarding whether the biometric information is spoofed based on whether the first information is detected, using an output vector output from an output layer of the neural network.

43 Claims, 12 Drawing Sheets

(51) Int. Cl.
*G06N 7/01* (2023.01)
*G06F 21/32* (2013.01)
*G06N 20/00* (2019.01)

(52) U.S. Cl.
CPC ........ *G06F 2221/031* (2013.01); *G06N 20/00* (2019.01)

(56) References Cited

U.S. PATENT DOCUMENTS

| | | | | |
|---|---|---|---|---|
| 2018/0374101 | A1* | 12/2018 | Coelho | G06V 40/172 |
| 2019/0347388 | A1 | 11/2019 | Jiang et al. | |
| 2021/0233541 | A1* | 7/2021 | Chen | G10L 17/02 |
| 2021/0280171 | A1* | 9/2021 | Phatak | G06N 20/00 |
| 2022/0284210 | A1* | 9/2022 | Ding | G06N 20/00 |

FOREIGN PATENT DOCUMENTS

| | | |
|---|---|---|
| KR | 10-2018-0069452 A | 6/2018 |
| KR | 10-1881505 B1 | 7/2018 |
| KR | 10-2019-0072314 A | 6/2019 |
| KR | 10-2020-0047294 A | 5/2020 |
| KR | 10-2151427 B1 | 9/2020 |
| KR | 10-2020-0131185 A | 11/2020 |

OTHER PUBLICATIONS

Nagpal, Chaitanya, et al., "A Performance Evaluation of Convolutional Neural Networks for Face Anti Spoofing", 2019 International Joint Conference on Neural Networks (IJCNN). IEEE, arXiv:1805.04176v2 [cs.CV] Mar. 27, 2019., 1-8.

Arora, Shefali, et al., "Fingerprint Spoofing Detection to Improve Customer Security in Mobile Financial Applications Using Deep Learning." Arabian journal for science and engineering 45.4 (2020): 2847-2863.

Wikipedia contributors. "Highway network." Wikipedia, The Free Encyclopedia. Wikipedia, Jun. 26, 2022. Web. Aug. 15, 2022., (2 pages in English).

Extended European search report issued on Jun. 10, 2022, in counterpart European Patent Application No. 21215118.7 (10 pages in English).

* cited by examiner

METHOD AND APPARATUS WITH BIOMETRIC INFORMATION SPOOF DETECTION

CROSS-REFERENCE TO RELATED APPLICATIONS

This application claims the benefit under 35 USC § 119(a) of Korean Patent Application No. 10-2021-0041814 filed on Mar. 31, 2021, and Korean Patent Application No. 10-2021-0058817 filed on May 6, 2021, in the Korean Intellectual Property Office, the entire disclosures of which are incorporated herein by reference for all purposes.

BACKGROUND

1. Field

The following description relates to a method and apparatus with biometric information spoof detection.

2. Description of Related Art

For smartphones and various mobile and wearable devices, security authentication technology for biometric information may be implemented. Since authentication through biometric information is convenient and easy to access, biometrics authentication may be used in various fields. Among such forms of technology, fingerprint recognition technology may be used due to a high level of convenience, security, and economic feasibility. In general, in fingerprint recognition, user authentication or verification may be performed by obtaining a fingerprint image of a user through a sensor and comparing the obtained fingerprint image to a pre-registered fingerprint image. When a finely fabricated fake fingerprint pattern is input to the sensor, a fingerprint recognizing device may not distinguish the fake fingerprint pattern from a genuine fingerprint pattern and thus, may recognize the fake fingerprint pattern as a biological fingerprint. For example, when a material such as rubber, silicone, gelatin, epoxy, or latex on which a fingerprint is engraved comes into contact with the sensor, the fingerprint engraved on such a material may be recognized as a human fingerprint. In terms of the security of biometric information, the fingerprint recognizing device may not discriminate fake biometric information from live biometric information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method with biometric information spoof detection includes: extracting an embedding vector from an intermediate layer of a neural network configured to detect whether biometric information of a user is spoofed from an image including the biometric information; detecting first information regarding whether the biometric information is spoofed, based on the embedding vector; and detecting second information regarding whether the biometric information is spoofed based on whether the first information is detected, using an output vector output from an output layer of the neural network.

The detecting of the first information may include: calculating a first score based on the embedding vector; and detecting the first information based on the first score.

The detecting of the first information based on the first score may include: determining whether the first score is a score in a first threshold range for determining the first information; and detecting the first information based on the first score, in response to determining that the first score is the score in the first threshold range.

The first threshold range may be determined based on a first threshold corresponding to a maximum probability that the first score is determined as a score corresponding to spoof information, and a second threshold corresponding to a minimum probability that the first score is determined as a score corresponding to live information.

The detecting of the first information based on the first score may include classifying, using a trained classifier, the first score as either one of a score in a range in which the biometric information is determined as spoof information, and a score in a range in which the biometric information is determined as live information.

The method may include outputting a classification result of the classifier, in response to the first information being detected based on the first score.

The method may include, in response to the first information being undetected based on the first score: extracting a $(1\text{-}2)^{th}$ embedding vector from an intermediate layer subsequent to the intermediate layer; calculating a $(1\text{-}2)^{th}$ score based on the $(1\text{-}2)^{th}$ embedding vector; and detecting the first information based on the $(1\text{-}2)^{th}$ score.

The detecting of the first information based on the $(1\text{-}2)^{th}$ score may include classifying, using a trained $(1\text{-}2)^{th}$ classifier, the $(1\text{-}2)^{th}$ score as either one of a score in a range in which the biometric information is determined as spoof information, and a score in a range in which the biometric information is determined as live information.

The method may include, in response to the first information being undetected based on the first score: extracting a $(1\text{-}2)^{th}$ embedding vector from an intermediate layer subsequent to the intermediate layer; calculating a $(1\text{-}2)^{th}$ score based on the $(1\text{-}2)^{th}$ embedding vector; fusing the first score and the $(1\text{-}2)^{th}$ score; and detecting the first information by classifying the fused score as either one of a score in a range in which the biometric information is determined as spoof information and a score in a range in which the biometric information is determined as live information.

The detecting of the second information may include detecting the second information based on a second score that is based on the output vector, in response to the first information being undetected.

The image may include a first image and a second image including the biometric information of the user, and the extracting of the embedding vector may include: extracting at least one $(1\text{-}1)^{th}$ embedding vector from at least one first intermediate layer of a first neural network configured to detect whether the biometric information is detected from the first image; and extracting at least one $(1\text{-}2)^{th}$ embedding vector from at least one second intermediate layer of a second neural network configured to detect whether the biometric information is detected from the second image.

The second image may include either one of an image acquired by capturing the biometric information of the user at a different time from the first image using a sensor, and an image generated through image processing of the first image.

The detecting of the first information may include: calculating a $(1\text{-}3)^{th}$ score based on the $(1\text{-}1)^{th}$ embedding vector and the $(1-2)^{th}$ embedding vector; and detecting the first information based on the $(1-3)^{th}$ score.

The detecting of the first information based on the $(1-3)^{th}$ score may include: determining whether the $(1-3)^{th}$ score is a score in a first threshold range for determining the first information; and detecting the first information based on the $(1-3)^{th}$ score, in response to determining that the $(1-3)^{th}$ score is the score in the first threshold range.

The detecting of the second information may include, in response to the first information being undetected based on the $(1-3)^{th}$ score: obtaining a first output vector from a first output layer of the first neural network; obtaining a second output vector from a second output layer of the second neural network; and detecting the second information based on the first output vector and the second output vector.

The detecting of the second information based on the first output vector and the second output vector may include detecting the second information based on a third score that is based on the first output vector and the second output vector.

The method may include: generating a $(1-3)^{th}$ embedding vector based on the $(1-1)^{th}$ embedding vector and the $(1-2)^{th}$ embedding vector; and calculating a $(1-3)^{th}$ score based on the $(1-3)^{th}$ embedding vector, wherein the detecting of the first information may include detecting the first information based on a $(1-1)^{th}$ score calculated based on the $(1-1)^{th}$ embedding vector, a $(1-2)^{th}$ score calculated based on the $(1-2)^{th}$ embedding vector, and the $(1-3)^{th}$ score.

The generating of the $(1-3)^{th}$ embedding vector may include either one of: combining the $(1-1)^{th}$ embedding vector and the $(1-2)^{th}$ embedding vector to generate the $(1-3)^{th}$ embedding vector; and performing an element-wise sum of the $(1-1)^{th}$ embedding vector and the $(1-2)^{th}$ embedding vector to generate the $(1-3)^{th}$ embedding vector.

The detecting of the first information may include: performing a $(1-1)^{th}$ classification of the $(1-1)^{th}$ score as a score in a range in which the biometric information is determined as spoof information or a score in a range in which the biometric information is determined as live information, using a trained $(1-1)^{th}$ classifier; performing a $(1-2)^{th}$ classification of the $(1-2)^{th}$ score as a score in the range in which the biometric information is determined as the spoof information or a score in the range in which the biometric information is determined as the live information, using a trained $(1-2)^{th}$ classifier; performing a $(1-3)^{th}$ classification of the $(1-3)^{th}$ score as a score in the range in which the biometric information is determined as the spoof information or a score in the range in which the biometric information is determined as the live information, using a trained $(1-3)^{th}$ classifier; and detecting the first information based on a result of the $(1-1)^{th}$ classification, a result of the $(1-2)^{th}$ classification, and a result of the $(1-3)^{th}$ classification.

The detecting of the first information based on the result of the $(1-1)^{th}$ classification, the result of the $(1-2)^{th}$ classification, and the result of the $(1-3)^{th}$ classification may include detecting the first information by a weighted sum of the result of the $(1-1)^{th}$ classification, the result of the $(1-2)^{th}$ classification, and the result of the $(1-3)^{th}$ classification.

The detecting of the first information based on the result of the $(1-1)^{th}$ classification, the result of the $(1-2)^{th}$ classification, and the result of the $(1-3)^{th}$ classification may include detecting the first information using majority voting of the result of the $(1-1)^{th}$ classification, the result of the $(1-2)^{th}$ classification, and the result of the $(1-3)^{th}$ classification.

The biometric information may include any one of a fingerprint, an iris, and a face of the user.

In another general aspect, one or more embodiments include a non-transitory computer-readable storage medium storing instructions that, when executed by a processor, configure the processor to perform any one, any combination, or all operations and methods described herein.

In another general aspect, an apparatus with biometric information spoof detection includes: a sensor configured to capture an image including biometric information of a user; and a processor configured to extract an embedding vector from an intermediate layer of a neural network configured to detect whether the biometric information is spoofed from the image, detect first information regarding whether the biometric information is spoofed, based on the embedding vector, and detect second information regarding whether the biometric information is spoofed based on whether the first information is detected, using an output vector output from an output layer of the neural network.

For the detecting of the first information, the processor may be configured to calculate a first score based on the embedding vector, and detect the first information based on the first score.

For the detecting of the first information based on the first score, the processor may be configured to determine whether the first score is a score in a first threshold range for determining the first information, and detect the first information based on the first score, in response to determining that the first score is the score in the first threshold range.

The first threshold range may be determined based on a first threshold corresponding to a maximum probability that the first score is determined as a score corresponding to spoof information, and a second threshold corresponding to a minimum probability that the first score is determined as a score corresponding to live information.

For detecting of the first information based on the first score, the processor may be configured to classify, using a trained classifier, the first score as either one of a score in a range in which the biometric information is determined as spoof information, and a score in a range in which the biometric information is determined as live information.

The processor may be configured to output a classification result of the classifier, in response to the first information being detected based on the first score.

In response to the first information being undetected based on the first score, the processor may be configured to extract a $(1-2)^{th}$ embedding vector from an intermediate layer subsequent to the intermediate layer, calculate a $(1-2)^{th}$ score based on the $(1-2)^{th}$ embedding vector, and detect the first information based on the $(1-2)^{th}$ score.

For the detecting of the first information based on the $(1-2)^{th}$ score, the processor may be configured to classify, using a trained $(1-2)^{th}$ classifier, the $(1-2)^{th}$ score as either one of a score in a range in which the biometric information is determined as spoof information, and a score in a range in which the biometric information is determined as live information.

In response to the first information being undetected based on the first score, the processor may be configured to extract a $(1-2)^{th}$ embedding vector from an intermediate layer subsequent to the intermediate layer, calculate a $(1-2)^{th}$ score based on the $(1-2)^{th}$ embedding vector, fuse the first score and the $(1-2)^{th}$ score, and detect the first information by classifying the fused score as either one of a score in a range in which the biometric information is determined as spoof information and a score in a range in which the biometric information is determined as live information.

For the detecting of the second information, the processor may be configured to detect the second information based on a second score that is based on the output vector, in response to the first information being undetected.

The image may include a first image and a second image including the biometric information of the user, and for the extracting of the embedding vector, the processor may be configured to extract at least one $(1\text{-}1)^{th}$ embedding vector from at least one first intermediate layer of a first neural network configured to detect whether the biometric information is detected from the first image, and extract at least one $(1\text{-}2)^{th}$ embedding vector from at least one second intermediate layer of a second neural network configured to detect whether the biometric information is detected from the second image.

The second image may include either one of an image acquired by capturing the biometric information of the user at a different time from the first image using a sensor, and an image generated through image processing of the first image.

For the detecting of the first information, the processor may be configured to calculate a $(1\text{-}3)^{th}$ score based on the $(1\text{-}1)^{th}$ embedding vector and the $(1\text{-}2)^{th}$ embedding vector, and detect the first information based on the $(1\text{-}3)^{th}$ score.

For the detecting of the first information based on the $(1\text{-}3)^{th}$ score, the processor may be configured to determine whether the $(1\text{-}3)^{th}$ score is a score in a first threshold range for determining the first information, and detect the first information based on the $(1\text{-}3)^{th}$ score, in response to determining that the $(1\text{-}3)^{th}$ score is the score in the first threshold range.

For the detecting of the second information, in response to the first information being undetected based on the $(1\text{-}3)^{th}$ score, the processor may be configured to obtain a first output vector from a first output layer of the first neural network, obtain a second output vector from a second output layer of the second neural network, and detect the second information based on the first output vector and the second output vector.

For the detecting of the second information based on the first output vector and the second output vector, the processor may be configured to detect the second information based on a third score that is based on the first output vector and the second output vector.

The processor may be configured to generate a $(1\text{-}3)^{th}$ embedding vector based on the $(1\text{-}1)^{th}$ embedding vector and the $(1\text{-}2)^{th}$ embedding vector, calculate a $(1\text{-}3)^{th}$ score based on the $(1\text{-}3)^{th}$ embedding vector, and detect the first information based on a $(1\text{-}1)^{th}$ score calculated based on the $(1\text{-}1)^{th}$ embedding vector, a $(1\text{-}2)^{th}$ score calculated based on the $(1\text{-}2)^{th}$ embedding vector, and the $(1\text{-}3)^{th}$ score.

The processor may be configured to generate the $(1\text{-}3)^{th}$ embedding vector by either one of combining the $(1\text{-}1)^{th}$ embedding vector and the $(1\text{-}2)^{th}$ embedding vector, and performing an element-wise sum of the $(1\text{-}1)^{th}$ embedding vector and the $(1\text{-}2)^{th}$ embedding vector.

For the detecting of the first information, the processor may be configured to perform a $(1\text{-}1)^{th}$ classification of the $(1\text{-}1)^{th}$ score as a score in a range in which the biometric information is determined as spoof information or a score in a range in which the biometric information is determined as live information, using a trained $(1\text{-}1)^{th}$ classifier, perform a $(1\text{-}2)^{th}$ classification of the $(1\text{-}2)^{th}$ score as a score in the range in which the biometric information is determined as the spoof information or a score in the range in which the biometric information is determined as the live information, using a trained $(1\text{-}2)^{th}$ classifier, perform a $(1\text{-}3)^{th}$ classification of the $(1\text{-}3)^{th}$ score as a score in the range in which the biometric information is determined as the spoof information or a score in the range in which the biometric information is determined as the live information, using a trained $(1\text{-}3)^{th}$ classifier, and detect the first information based on a result of the $(1\text{-}1)^{th}$ classification, a result of the $(1\text{-}2)^{th}$ classification, and a result of the $(1\text{-}3)^{th}$ classification.

For the detecting of the first information based on the result of the $(1\text{-}1)^{th}$ classification, the result of the $(1\text{-}2)^{th}$ classification, and the result of the $(1\text{-}3)^{th}$ classification, the processor may be configured to detect the first information by a weighted sum of the result of the $(1\text{-}1)^{th}$ classification, the result of the $(1\text{-}2)^{th}$ classification, and the result of the $(1\text{-}3)^{th}$ classification.

For the detecting of the first information based on the result of the $(1\text{-}1)^{th}$ classification, the result of the $(1\text{-}2)^{th}$ classification, and the result of the $(1\text{-}3)^{th}$ classification, the processor may be configured to detect the first information using majority voting of the result of the $(1\text{-}1)^{th}$ classification, the result of the $(1\text{-}2)^{th}$ classification, and the result of the $(1\text{-}3)^{th}$ classification.

In another general aspect, an electronic device includes: a fingerprint sensor configured to capture an image including fingerprint information of a user; a processor configured to extract at least one embedding vector from an intermediate layer of a neural network configured to detect whether the fingerprint information is spoofed from the image, detect first information regarding whether the fingerprint information is spoofed, based on the at least one embedding vector, and detect second information regarding whether the fingerprint information is spoofed based on whether the first information is detected, using an output vector output from an output layer of the neural network; and an output device configured to output at least one of the first information and the second information.

The fingerprint sensor may include any one or any combination of an ultrasonic fingerprint sensor, an optical fingerprint sensor, and an electrostatic fingerprint sensor.

In another general aspect, a method with biometric information spoof detection includes: determining either one or both of a first vector of a layer and a second vector of another layer of a neural network, based on biometric information; calculating a score based on the first vector; and performing a spoof detection based on either the first vector or the second vector, based on whether the score is within a predetermined range.

The first vector may be an embedding vector of an intermediate layer of the neural network and the second vector may be an output vector of an output layer of the neural network.

The performing of the spoof detection may include: performing the spoof detection based on the embedding vector, in response to the score being within the predetermined range; and performing the spoof detection based on the output vector, in response to the score being outside the predetermined range.

The neural network may be a deep neural network, and the performing of the spoof detection based on the embedding vector may include using a shallow neural network.

The predetermined range may include a range above a first threshold and a range below a second threshold, and the first threshold may be greater than the second threshold.

Other features and aspects will be apparent from the following detailed description, the drawings, and the claims.

Figure 1:
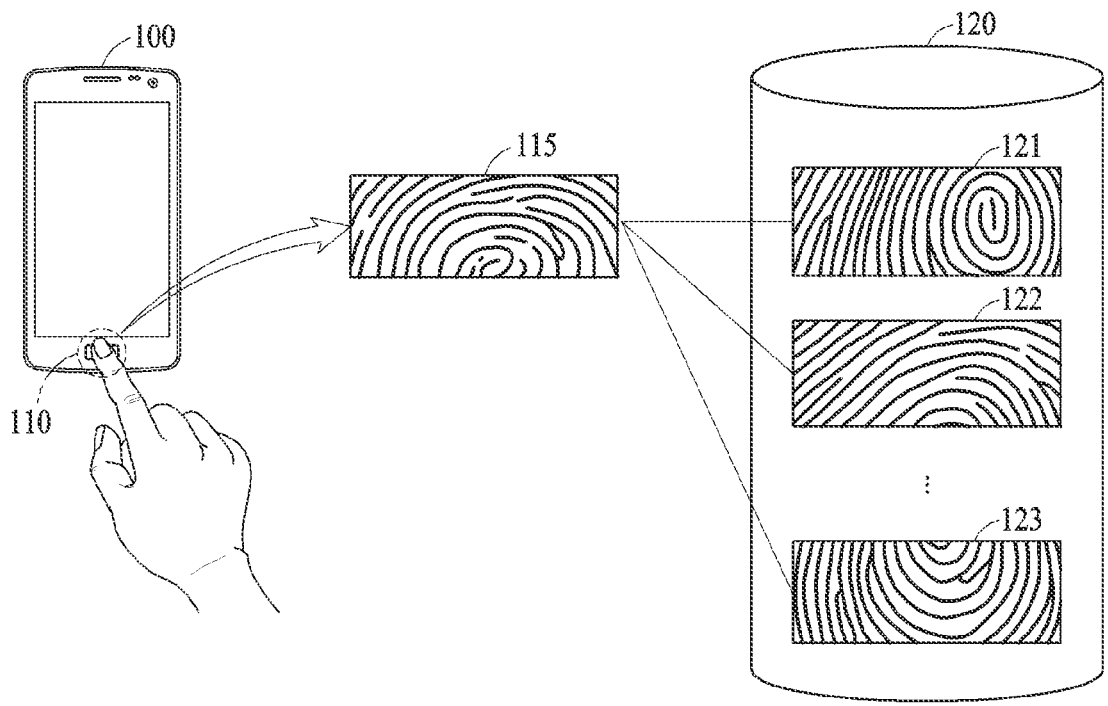
FIG. 1 illustrates an example of an environment that detects whether biometric information is spoofed.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The terminology used herein is for the purpose of describing examples only and is not to be limiting of the examples. As used herein, the singular forms "a", "an", and "the" are intended to include the plural forms as well, unless the context clearly indicates otherwise. As used herein, the term "and/or" includes any one and any combination of any two or more of the associated listed items. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined herein, all terms used herein including technical or scientific terms have the same meaning as commonly understood by one of ordinary skill in the art to which examples belong and based on an understanding of the disclosure of the present application. It will be further understood that terms, such as those defined in commonly-used dictionaries, should be interpreted as having a meaning that is consistent with their meaning in the context of the relevant art and the disclosure of the present application and will not be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of an environment that detects whether biometric information is spoofed. FIG. 1 illustrates a detection apparatus 100 that includes a sensor 110 configured to sense biometric information (for example, a fingerprint) of a user, and an enrolled fingerprint database (DB) 120 that includes enrolled fingerprint images 121, 122, and 123. An example in which biometric information of a user is fingerprint will be described below for convenience of description, however, examples are not limited thereto. The biometric information may include a variety of information, for example, a fingerprint, an iris, lines of a palm, and/or a face.

The detection apparatus 100 may obtain an input fingerprint image 115 representing a fingerprint of a user through the sensor 110. The sensor 110 may include, for example, an ultrasonic fingerprint sensor, an optical fingerprint sensor, an electrostatic fingerprint sensor, and/or an image sensor, which may capture a fingerprint of a user, but is not limited thereto.

Fingerprint enrollment for fingerprint recognition may be performed. The enrolled fingerprint images 121, 122, and 123 may be stored in advance in the enrolled fingerprint DB 120 through a fingerprint enrollment process. In one or more non-limiting examples, for personal information protection, the enrolled fingerprint DB 120 may store features extracted from the enrolled fingerprint images 121, 122, and 123, instead of storing the enrolled fingerprint images 121, 122, and 123 without a change. The enrolled fingerprint DB 120 may be stored in a memory included in the detection apparatus 100, and/or in an external device such as a server or a local cache that may communicate with the detection apparatus 100.

When the input fingerprint image 115 for authentication is received, the detection apparatus 100 may recognize a fingerprint of a user by comparing a fingerprint (hereinafter, referred to as an "input fingerprint") included in the input fingerprint image 115 and enrolled fingerprints included in the enrolled fingerprint images 121, 122, and 123. The detection apparatus 100 may compare a feature of the input fingerprint and features of the enrolled fingerprints.

Biometric authentication may include a matching process of verifying whether a user attempting authentication has the authority to access, and an anti-spoofing (ASP) process of determining whether biometric information is forged/spoofed. Since spoofing is performed by mimicking, falsifying, or duplicating biometric information of a user to attempt authentication, it may be difficult for a typical detection apparatus to increase an accuracy and a speed of spoofing detection.

For example, when the input fingerprint image 115 is obtained by sensing a fake fingerprint and when a fingerprint pattern of the input fingerprint image 115 is similar to a fingerprint pattern of one of the enrolled fingerprint images 121, 122, and 123, authentication for the fake fingerprint may be likely to succeed in the typical detection apparatus. The detection apparatus 100 of one or more embodiments may prevent spoofing by determining whether the input fingerprint in the input fingerprint image 115 is a fake fingerprint or a real fingerprint of a person. The term "spoofing" used herein may indicate fake biometric information, not live biometric information, and may be construed as including, for example, duplication, forgery, and falsification of biometric information.

In an example, the detection apparatus 100 may operate as an anti-spoofing apparatus for detecting whether an input fingerprint is a fake fingerprint, or may include a separate anti-spoofing apparatus. In the following description, an anti-spoofing apparatus may be referred to as a "detection apparatus".

The detection apparatus 100 may determine whether an input fingerprint is a fake fingerprint, based on a plurality of unspecified real fingerprint features provided in advance, a plurality of unspecified fake fingerprint features provided in advance, and/or enrolled fingerprint features of a device user, non-limiting examples of which will be further described below.

Figure 2:
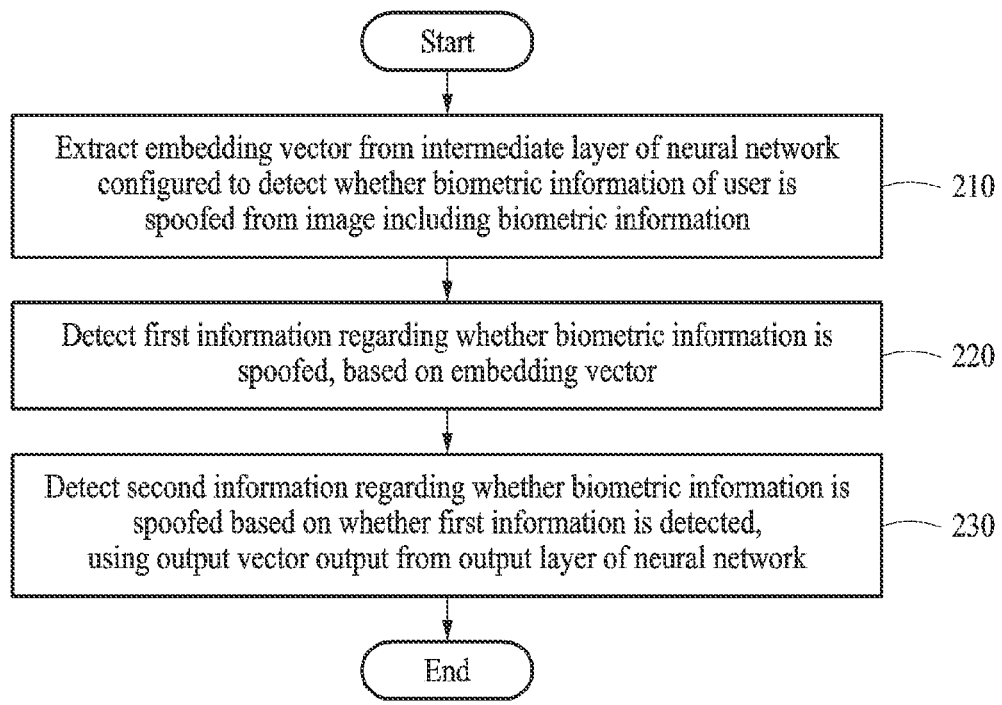
FIG. 2 illustrates an example of a method of detecting whether biometric information is spoofed.

FIG. 2 illustrates an example of a method of detecting whether biometric information is spoofed. In the following example, operations may be sequentially performed, but is not performed sequentially. For example, the order of operations may be changed, and at least two operations may be performed in parallel.

FIG. 2 illustrates a process in which an apparatus (e.g., the detection apparatus 100) for detecting whether biometric information is spoofed detects whether biometric information is spoofed through a process of operations 210 to 230. In the following description, an apparatus for detecting whether biometric information is spoofed may be referred to as a "detection apparatus". In an example, the operations described below may be performed after a matching process of verifying whether a user attempting user authentication with biometric information in a biometrics authentication process has an authority to access a system, that is, is an enrolled user of the system. However, examples are not limited thereto, and the operations described below may be performed before or simultaneously with the matching process, according to other non-limiting examples.

In operation 210, the detection apparatus may extract an embedding vector from an intermediate layer of a neural network configured to detect whether biometric information of a user is spoofed from an image including the biometric information.

The detection apparatus may receive an image including biometric information sensed from a user through one or more various sensors and may input the image to a neural network that detects whether biometric information is spoofed. The neural network may be trained to extract a feature or a feature vector suitable for detecting whether biometric information is spoofed. The neural network may be trained based on a plurality of pieces of unspecified live biometric information and a plurality of pieces of unspecified spoof biometric information. An embedding vector extracted by the neural network may include feature information suitable for detecting whether biometric information is spoofed, and the embedding vector may also be referred to as a "feature vector". The neural network may include, for example, a deep neural network (DNN) of FIG. 3, and/or a convolutional neural network (CNN), but is not limited thereto.

The various sensor(s) may include, for example, an ultrasonic fingerprint sensor, an optical fingerprint sensor, an electrostatic fingerprint sensor, a depth sensor, an iris sensor, and/or an image sensor, but is not limited thereto. One of the sensors may be used, or at least two of the sensors may also be used. Biometric information sensed by a sensor may be, for example, the input fingerprint image 115 of FIG. 1, an iris image, or a face image.

One image or a plurality of images may include biometric information. When one image includes biometric information of a user, one neural network may be used, and when a plurality of images include biometric information of a user, a number of neural networks corresponding to a number of the images may be used.

To infer scores for each image, neural networks may be present for each image. One or more embedding vectors may be extracted from each neural network.

Non-limiting examples of a structure and an operation of a detection apparatus for detecting whether biometric information of a user is spoofed from a single image including the biometric information will be further described below with reference to FIGS. 4 to 7. In addition, non-limiting examples of a structure and an operation of a detection apparatus for detecting whether biometric information of a user is spoofed from a plurality of images (for example, two images) including the biometric information will be further described below with reference to FIGS. 8 to 11.

In operation 220, the detection apparatus may detect first information regarding whether the biometric information is spoofed, based on the embedding vector extracted in operation 210. For example, the detection apparatus may infer the first information by a combination or an ensemble of embedding vectors extracted in the same operation, or may infer the first information based on an individual embedding vector or a plurality of inference results of individual embedding vectors. For example, the detection apparatus may calculate a first score based on the embedding vector extracted in operation 210. The detection apparatus may detect the first information based on the first score. In the following description, the first information may be construed to indicate whether spoofing occurs detected based on a score (for example, the first score) calculated based on an embedding vector extracted from an intermediate layer of a neural network.

The first score may correspond to, for example, a similarity score calculated based on a result of comparing the embedding vector to authentication information (for example, an enrolled feature vector of a fingerprint image) included in an enrollment DB. However, examples are not limited thereto. The first score may be calculated by, for example, a trained classifier, a regression neural network, and/or a shallow DNN of FIG. 4, however, examples are not limited thereto.

In operation 220, the detection apparatus may determine whether the first score is a score in a first threshold range for determining the first information. For example, the first threshold range may be construed as a range (for example, a section 630 of FIG. 6), for clearly determining biometric information corresponding to a score as spoof information, and a range (for example, a section 650 of FIG. 6) for clearly determining biometric information corresponding to a score as live information. The first threshold range may be determined based on a first threshold (for example, a reject threshold 620) corresponding to a maximum probability that the first score is determined as a score corresponding to spoof information, and a second threshold (for example, an accept threshold 640) corresponding to a minimum probability that the first score is determined as a score corresponding to live information. When the first score is determined as a score in the first threshold range, the detection apparatus may detect the first information based on the first score.

In operation 220, the detection apparatus may classify the first score as a score in a range in which the biometric information is determined as spoof information or a score in a range in which the biometric information is determined as live information, using a trained classifier. When the first information is detected based on the first score, the detection apparatus may output a classification result of a classifier, for example, a first classifier.

In an example, the first classifier may determine the first information based on a limited result (for example, the embedding vector extracted from the intermediate layer). For example, when it is difficult to determine the first information based on given information due to relatively high uncertainty, the first classifier may defer the determination of whether spoofing occurs, and may allow a second classifier to determine whether spoofing occurs. The second classifier may be configured to determine (for example, second information determined in operation 230) whether spoofing occurs, using an output vector output from an output layer subsequent to the intermediate layer in the neural network. The first classifier may also be referred to as an "early decision classifier (EDC)" in that the first classifier early classifies whether spoofing occurs based on an embedding vector extracted from an intermediate layer before the output layer (e.g., classifies earlier than classifying using the output vector from the output layer).

A number of first classifiers may be determined based on a number of levels in an intermediate layer through which the detection apparatus performs an early decision. In an example, when the detection apparatus performs the early decision through one level of the intermediate layer, one first classifier may be used. In another example, when the detection apparatus performs the early decision through a plurality of levels of the intermediate layer, a plurality of first classifiers may be used.

Figure 6:
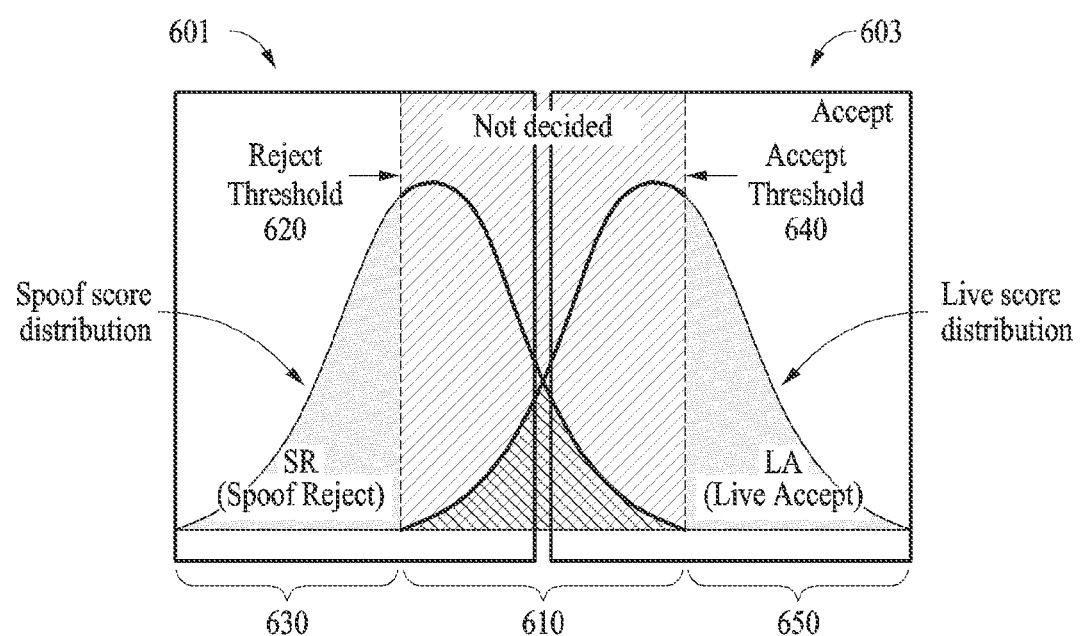
FIG. 6 illustrates an example of a first threshold range.

Unlike a typical binary classifier that has one threshold and distinguishes between acceptance or rejection, the first classifier may classify scores into three classes, for example, "Accept", "Reject", and "Not decided", through two thresholds (for example, the reject threshold 620 and the accept threshold 640 of FIG. 6).

In an example, when the first score is greater than the accept threshold 640, the detection apparatus may determine the image as live information, and when the first score is less than the reject threshold 620, the detection apparatus may determine the image as spoof information. In another example, when the first score is greater than or equal to the reject threshold 620 and less than or equal to the accept threshold 640, the detection apparatus may determine whether spoofing occurs based on a second score calculated from the output vector, instead of based on the first score and not on the second score.

In operation 230, the detection apparatus may detect second information regarding whether the biometric information is spoofed, based on whether the first information is detected, using an output vector output from an output layer of the neural network. For example, when the first information is not detected, the detection apparatus may detect the second information based on a second score that is based on the output vector. The second score may correspond to, for example, a similarity score calculated based on a result of comparing the output vector to authentication information (for example, an enrolled feature vector of a fingerprint image) included in the enrollment DB, but is not limited thereto. In the following description, the second information may be construed as information regarding whether spoofing occurs, detected based on a score (for example, the second score) calculated based on an output vector extracted from an output layer of a neural network.

In operation 230, the detection apparatus may classify the second score as a score in a range in which the biometric information is determined as spoof information or a score in a range in which the biometric information is determined as live information, using a trained second classifier. The second classifier may determine whether spoofing occurs by performing a binary decision of live information or spoof information based on the second score.

Figure 3:
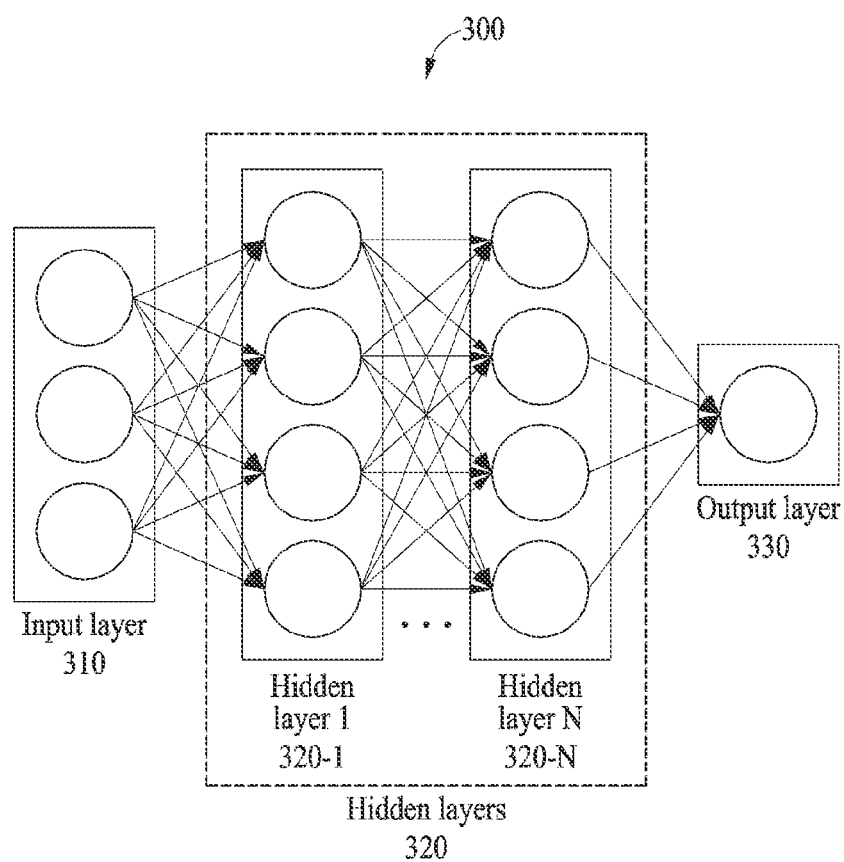
FIG. 3 illustrates an example of a structure of a neural network.

FIG. 3 illustrates an example of a structure of a neural network. FIG. 3 illustrates a structure of a DNN 300 as an example of a neural network. The DNN 300 may be trained through deep learning.

The DNN 300 may include a plurality of layers 310, 320, and 330 that each include a plurality of nodes. The DNN 300 may include connection weights to connect a plurality of nodes included in each of the plurality of layers 310, 320, and 330 to a node included in another layer. The detection apparatus may obtain the DNN 300 from an internal DB stored in a memory (for example, a memory 1290 of FIG. 12), or obtain the DNN 300 by receiving the DNN 300 from an external server via a communication interface (for example, a communication interface 1250 of FIG. 12).

For example, the DNN 300 may include a large number of nodes connected by edges in forms of lines. An node may be expressed by a circular shape in FIG. 3, and may also be referred to as a "node". Nodes may be connected to each other via edges having connection weights. A connection weight may be a predetermined value of each of edges, and may also be referred to as a "weight" or a "connection strength".

For example, the DNN 300 may include an input layer 310, a hidden layer 320, and an output layer 330. Each of the input layer 310, the hidden layer 320, and the output layer 330 may include a plurality of nodes. A node included in the input layer 310 may be referred to as an "input node", a node included in the hidden layer 320 may be referred to as a "hidden node", and a node included in the output layer 330 may be referred to as an "output node".

The input layer 310 may receive an input for performing training or recognition and transmit the input to the hidden layer 320. The output layer 330 may generate an output of the DNN 300 based on a signal received from the hidden layer 320. The hidden layer 320 may be located between the input layer 310 and the output layer 330, and may change a training input of training data received via the input layer 310 to a value that is relatively more easily predictable. Input nodes included in the input layer 310 and hidden nodes included in the hidden layer 320 may be connected to each other via connection lines with connection weights. Also, hidden nodes included in the hidden layer 320 and output nodes included in the output layer 330 may be connected to each other via connection lines with connection weights.

The hidden layer 320 may include a plurality of layers, for example, hidden layers 320-1 to 320-N. For example, when the hidden layer 320 is assumed to include a first hidden layer, a second hidden layer and a third hidden layer, an output of a hidden node included in the first hidden layer may be connected to hidden nodes included in the second hidden layer. Also, an output of a hidden node included in the second hidden layer may be connected to hidden nodes included in the third hidden layer.

For example, the detection apparatus may input outputs of previous hidden nodes included in a previous hidden layer to a corresponding hidden layer via connection lines with connection weights. Also, the detection apparatus may generate outputs of hidden nodes included in a hidden layer based on an activation function and values obtained by applying connection weights to the outputs of the previous hidden nodes. In an example, when a result of the activation function exceeds a threshold of a current hidden node, an output may be transmitted to a next hidden node. In this example, the current hidden node may not transmit a signal to a next node until reaching a predetermined threshold activation strength through input vectors, and may remain in an inactive state.

The hidden layer 320 may also be called an "intermediate layer" in that the hidden layer 320 is located between the input layer 310 and the output layer 330. In the following description, the expressions "hidden layer" and "intermediate layer" may be construed to have the same meanings.

The detection apparatus may train the DNN 300 through supervised learning. The detection apparatus may be implemented by, for example, a software module, a hardware module, or a combination thereof. The supervised learning may be a scheme of inputting, to the DNN 300, a training input of training data together with a training output of the training data corresponding to the training input and updating connection weights of connection lines so that output data corresponding to the training output is output. The training data may be, for example, data including a pair of a training input and a training output.

Although the structure of the DNN 300 is expressed as a node structure in FIG. 3, examples are not limited to the node structure. Various data structures may be used to store a neural network in a memory.

In an example, the detection apparatus may determine parameters of nodes included in the DNN 300 through a gradient descent scheme based on an error that is propagated backwards to the DNN 300 and based on output values of the nodes.

For example, the detection apparatus may update connection weights between nodes through error backpropagation learning. The error backpropagation learning may be a scheme of estimating an error by a forward computation of given training data, propagating the estimated error backwards from the output layer 330 to the hidden layer 320 and the input layer 310, and updating connection weights to reduce an error.

The DNN 300 may be processed in an order of the input layer 310, the hidden layer 320, and the output layer 330, however, connection weights in the error backpropagation learning may be updated in an order of the output layer 330, the hidden layer 320, and the input layer 310. For example, at least one processor may use a buffer memory configured to store layers or calculation data to process a neural network in a desired order.

The detection apparatus may define an objective function to measure how close currently set connection weights are to an optimal value, may continue to change the connection weights based on a result of the objective function, and may repeatedly perform training. For example, the objective function may be a loss function used to calculate a loss between an expected value to be output and an actual output value based on a training input of training data in the DNN 300. The detection apparatus may update the connection weights to reduce a value of the loss function.

The DNN 300 may be trained to determine live information or spoof information through a network, so that a final output layer may output an optimal result. However, each intermediate layer constituting the network, being other than the final output layer, may also discriminate live information from spoof information in a training process. Accordingly, the detection apparatus of one or more embodiments may also use an output of an intermediate layer to discriminate live information from spoof information, and accordingly the detection apparatus of one or more embodiments may derive whether biometric information is spoofed before proceeding to the final output layer 330, when the intermediate layer is used. Thus, the detection apparatus of one or more embodiments may reduce an execution time.

The detection apparatus of one or more embodiments may increase a speed of detection of whether spoofing occurs while minimizing a decrease in an accuracy of spoofing detection, using an intermediate layer used to discriminate live information from spoof information in an operation before the DNN 300 derives a final result. Also, the detection apparatus of one or more embodiments may minimize the decrease in the accuracy based on results of networks that receive different images as inputs, to compensate for the decrease in the accuracy using an output of the intermediate layer.

Figure 4:
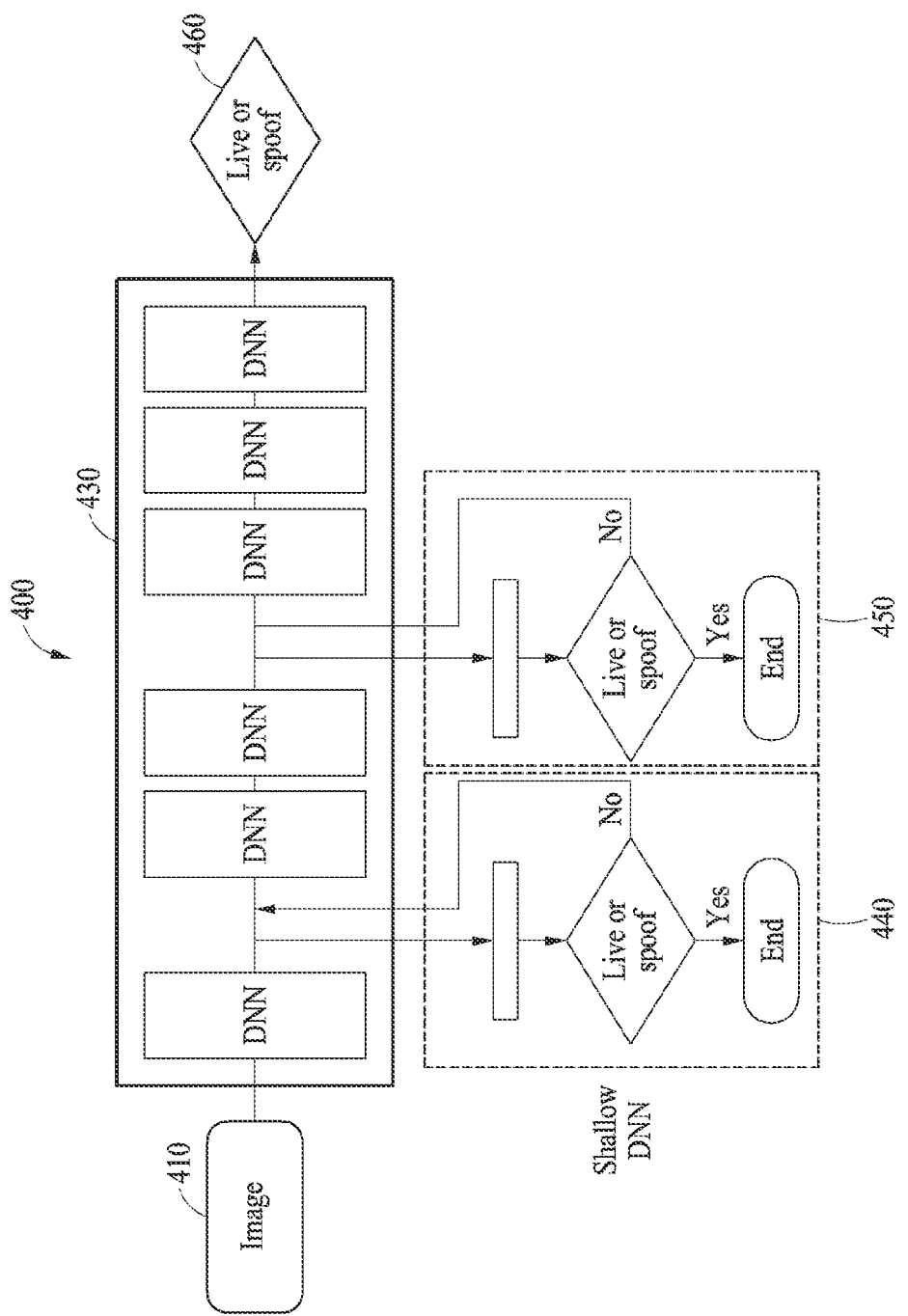
FIG. 4 illustrates an example of a network structure and an operation of an apparatus for detecting whether biometric information is spoofed.
Figure 5:
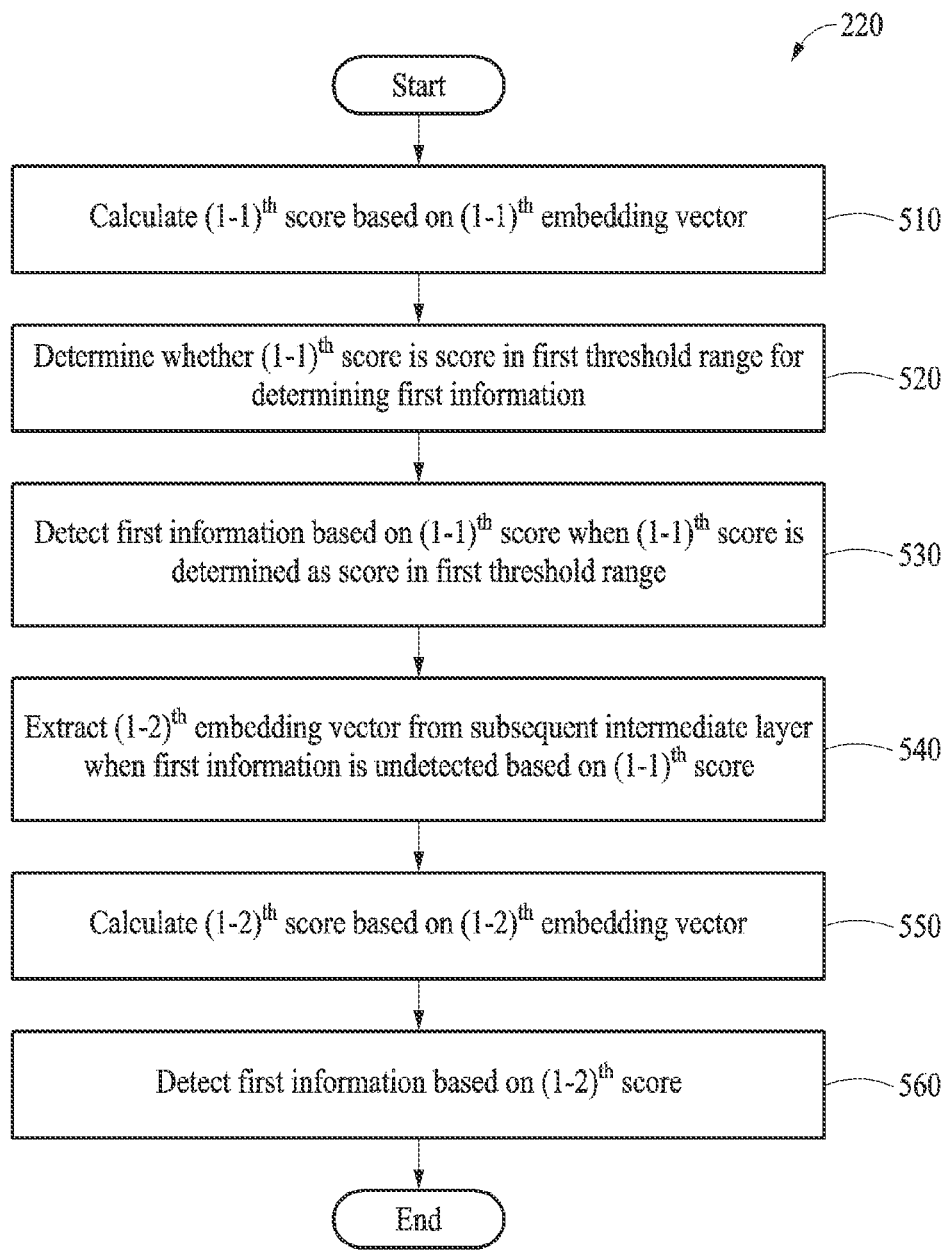
FIG. 5 illustrates an example of detecting first information regarding whether biometric information is spoofed.

FIG. 4 illustrates an example of a network structure and an operation of an apparatus for detecting whether biometric information is spoofed, and FIG. 5 illustrates an example of detecting first information regarding whether biometric information is spoofed.

FIGS. 4 and 5 illustrate a structure and an operation of a detection apparatus 400 that includes a $(1-1)^{th}$ classifier 440, a $(1-2)^{th}$ classifier 450, and a second classifier 460. The $(1-1)^{th}$ classifier 440 and a $(1-2)^{th}$ classifier 450 may each include a shallow DNN.

Unlike a classifier of a typical DNN with an end-to-end structure, the $(1-1)^{th}$ classifier 440 and the $(1-2)^{th}$ classifier 450 may receive an image 410 including biometric information and may classify whether biometric information is spoofed from embedding vectors extracted from intermediate layers of a DNN 430 during a network inference.

The embedding vectors extracted from the intermediate layers of The DNN 430 may be applied to the $(1-1)^{th}$ classifier 440 and the $(1-2)^{th}$ classifier 450 and may be used to detect first information regarding whether the biometric information is spoofed. The $(1-1)^{th}$ classifier 440 and the $(1-2)^{th}$ classifier 450 may be classifiers trained to classify an input image based on embedding vectors. The $(1-1)^{th}$ classifier 440 and the $(1-2)^{th}$ classifier 450 may include a shallow DNN with a less computation amount than that of a DNN, and may quickly detect the first information without a reduction in a speed due to a small overhead caused by an early decision (ED) in an intermediate layer.

An example in which the $(1-1)^{th}$ classifier 440 and the $(1-2)^{th}$ classifier 450 detect the first information will be described below.

The detection apparatus 400 may extract an embedding vector (for example, a $(1-1)^{th}$ embedding vector) from an intermediate layer of the DNN 430 using the $(1-1)^{th}$ classifier 440. In operation 510, the detection apparatus 400 may calculate a $(1-1)^{th}$ score based on the $(1-1)^{th}$ embedding vector. The detection apparatus 400 may detect the first information based on the $(1-1)^{th}$ score. In operation 520, the detection apparatus 400 may determine whether the $(1-1)^{th}$ score is a score in a first threshold range for determining the first information, using the $(1-1)^{th}$ classifier 440 that is trained. The detection apparatus 400 may classify the $(1-1)^{th}$ score as a score in a range in which the biometric information is determined as first spoof information or a score in a range in which the biometric information is determined as live information.

For example, when the $(1-1)^{th}$ score is determined as a score in the first threshold range, the detection apparatus 400 may detect the first information based on the $(1-1)^{th}$ score in operation 530.

When the first information is not detected based on the $(1-1)^{th}$ score, the detection apparatus 400 may extract a $(1-2)^{th}$ embedding vector from an intermediate layer subsequent to the intermediate layer of the DNN 430, using the $(1-2)^{th}$ classifier 450 in operation 540.

In operation 550, the detection apparatus 400 may calculate a $(1-2)^{th}$ score based on the $(1-2)^{th}$ embedding vector.

In operation 560, the detection apparatus 400 may detect the first information based on the $(1-2)^{th}$ score calculated in operation 550. In operation 560, the detection apparatus 400 may determine whether the $(1-2)^{th}$ score is a score in the first threshold range for determining the first information, using the $(1-2)^{th}$ classifier 450 that is trained. The detection apparatus 400 may classify the $(1-2)^{th}$ score as a score in a range in which the biometric information is determined as first spoof information or a score in a range in which the biometric information is determined as live information. For example, when the $(1-2)^{th}$ score is determined as a score in the first threshold range, the detection apparatus 400 may detect the first information based on the $(1-2)^{th}$ score.

In an example, when the first information is detected based on the $(1-2)^{th}$ score, the detection apparatus 400 may output a classification result of the $(1-2)^{th}$ classifier 450. In another example, when the first information is not detected based on the $(1-2)^{th}$ score, the detection apparatus 400 may detect second information regarding whether the biometric information is spoofed by applying an output vector output from an output layer of the DNN 430 to the second classifier 460.

For example, the detection apparatus 400 may detect the first information based on the $(1-1)^{th}$ classifier 440 and the $(1-2)^{th}$ classifier 450 that perform an early decision classification before the output vector is derived from the output layer. In this example, the first information may be immediately detected even though the output vector is not used. Thus, the detection apparatus 400 of one or more embodiments may reduce a time used to determine whether biometric information is spoofed.

When whether biometric information is spoofed is determined, an accuracy of the determining and a speed of detecting whether biometric information is spoofed may be in a trade-off relationship. The detection apparatus 400 may use the $(1-1)^{th}$ classifier 440 and the $(1-2)^{th}$ classifier 450 for relatively quick determination. When the $(1-1)^{th}$ classifier 440 and the $(1-2)^{th}$ classifier 450 have relatively high detection reliability, the first information may be immediately used. When the $(1-1)^{th}$ classifier 440 and the $(1-2)^{th}$ classifier 450 have relatively low detection reliability, the second information may be determined from the output vector by the second classifier 460.

FIG. 6 illustrates an example of a first threshold range. Referring to FIG. 6, a graph 601 showing a probability distribution of a first score corresponding to spoof information and a graph 603 showing a probability distribution of a first score corresponding to live information are illustrated.

In example, when it is clearly determined as to whether a first score calculated based on an embedding vector falls within a range in which biometric information is determined as live information or falls within a range in which biometric information is determined as spoof information, a detection apparatus may immediately detect whether the biometric information is spoofed based on the first score. In another example, when it is not clearly determined as to whether the first score falls within the range in which the biometric information is determined as live information or falls within the range in which biometric information is determined as spoof information, the detection apparatus may not immediately determine whether the biometric information is spoofed based on the first score.

In an example, the first threshold range may correspond to a probability range in which it may be clearly determined whether biometric information is spoofed based on the first score. The first threshold range may be for distinguishing a first score for which a determination is not made whether biometric information is spoofed. When whether a determination that the biometric information is spoofed is not immediately made based on the first score, the detection apparatus may determine whether the biometric information is spoofed based on a second score.

The reject threshold 620 in the graph 601 may correspond to a maximum value (Max(Spoof Score)) of the probability that the first score is determined to fall within the range in which biometric information is clearly determined as spoof information. In addition, the accept threshold 640 in the graph 603 may correspond to a minimum value (Min(Live Score)) of the probability that the first score is determined to fall within the range in which biometric information is clearly determined as live information.

The first threshold range may be determined based on the reject threshold 620 corresponding to the maximum probability (Max(Spoof Score)) that the first score is determined to fall within the range in which biometric information is determined as spoof information, and the accept threshold 640 corresponding to the minimum probability (Min(Live Score)) that the first score is determined to fall within the range in which biometric information is determined as live information. The first threshold range may correspond to a range outside a section 610 that is greater than the reject threshold 620 in the graph 601 and less than the accept threshold 640 in the graph 603. In the graph 601, when the first score is in the section 630 that is less than or equal to the reject threshold 620, the first score may be determined to fall within the range in which biometric information is clearly determined as spoof information. In addition, in the graph 603, when the first score is in the section 650 that is greater than or equal to the accept threshold 640, the first score may be determined to fall within the range in which biometric information is clearly determined as live information.

In an example, when the first score falls within the section 630 or the section 650, the detection apparatus may determine that the first score falls within the first threshold range and may immediately detect first information regarding whether the biometric information is spoofed based on the first score. In another example, when the first score falls within the section 610, the detection apparatus may determine that the first score does not fall within the first threshold range and may immediately detect second information regarding whether the biometric information is spoofed based on a second score calculated from an output vector.

Figure 7:
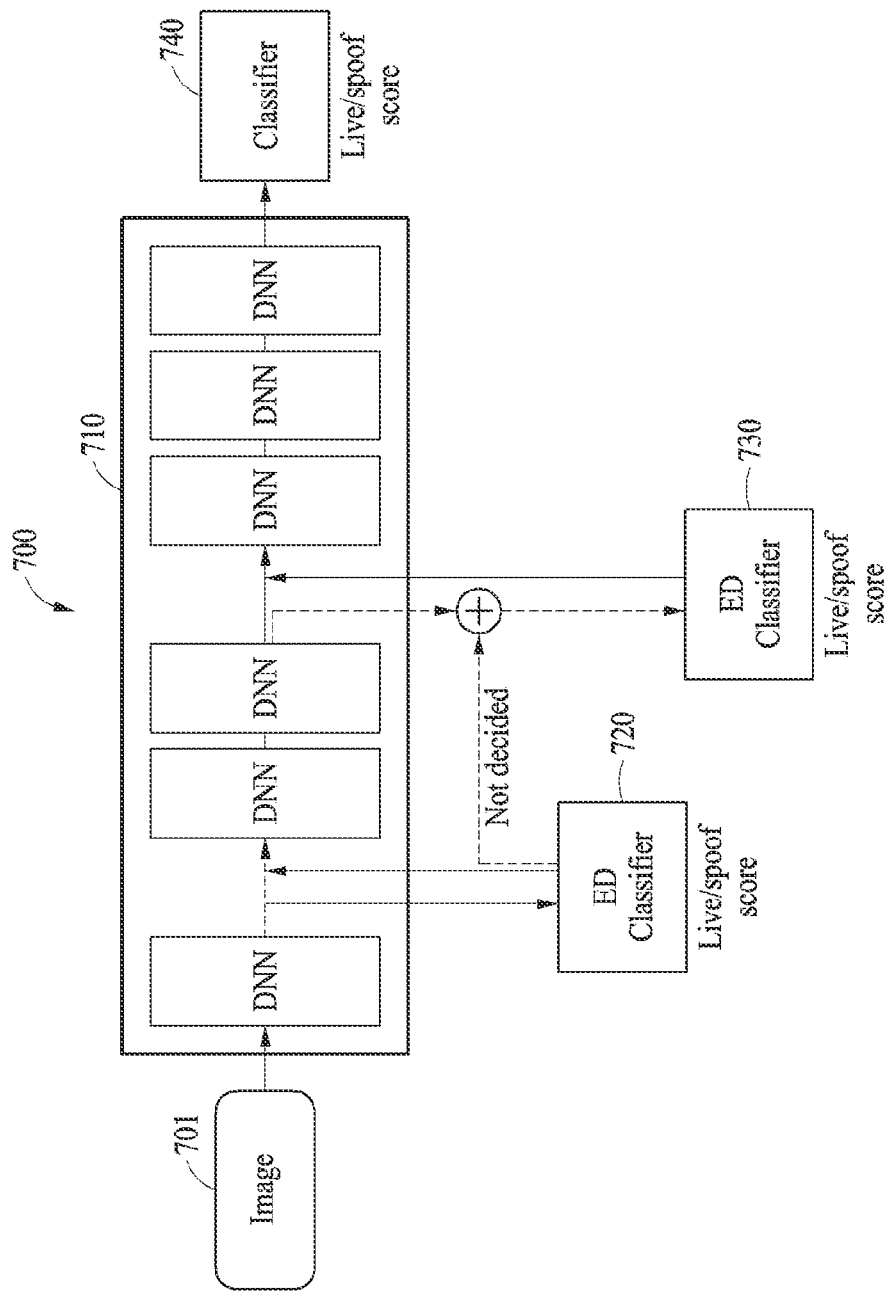
FIGS. 7 to 11 illustrate examples of a network structure and an operation of an apparatus for detecting whether biometric information is spoofed.

FIG. 7 illustrates another example of a network structure and an operation of an apparatus for detecting whether biometric information is spoofed. FIG. 7 illustrates a structure of a detection apparatus 700 configured to detect whether biometric information is spoofed by fusing a first score (for example, $(1-1)^{th}$ score) of an embedding vector (for example, a $(1-1)^{th}$ embedding vector) extracted from an intermediate layer and a $(1-2)^{th}$ score of an embedding vector (for example, a $(1-2)^{th}$ embedding vector) extracted from an intermediate layer subsequent to the intermediate layer when whether the biometric information is spoofed is not detected based on the first score.

When an image 701 including biometric information of a user is input to a DNN 710, the detection apparatus 700 may calculate a $(1-1)^{th}$ score based on a $(1-1)^{th}$ embedding vector extracted from an intermediate layer of the DNN 710. The detection apparatus 700 may detect first information regarding whether the biometric information is spoofed based on the $(1-1)^{th}$ score. The detection apparatus 700 may classify the $(1-1)^{th}$ score as a score in a range in which the biometric information is determined as spoof information or a score in a range in which the biometric information is determined as live information, using a $(1-1)^{th}$ classifier 720.

For example, when the first information is not detected based on the $(1-1)^{th}$ score, the detection apparatus 700 may extract a $(1-2)^{th}$ embedding vector extracted from an intermediate layer subsequent to the intermediate layer. The detection apparatus 700 may calculate a $(1-2)^{th}$ score based on the $(1-2)^{th}$ embedding vector and may fuse the $(1-1)^{th}$ score and the $(1-2)^{th}$ score.

The detection apparatus 700 may detect the first information based on a fused score. The detection apparatus 700 may detect the first information by classifying the fused score as a score in the range in which the biometric information is determined as spoof information or a score in the range in which the biometric information is determined as live information, using a $(1-2)^{th}$ classifier 730.

When the first information is not detected using the $(1-2)^{th}$ classifier 730, the detection apparatus 700 may detect second information regarding whether the biometric information is spoofed from an output vector of the DNN 710. The detection apparatus 700 may use a second classifier 740 to detect the second information from the output vector of the DNN 710.

Figure 8:
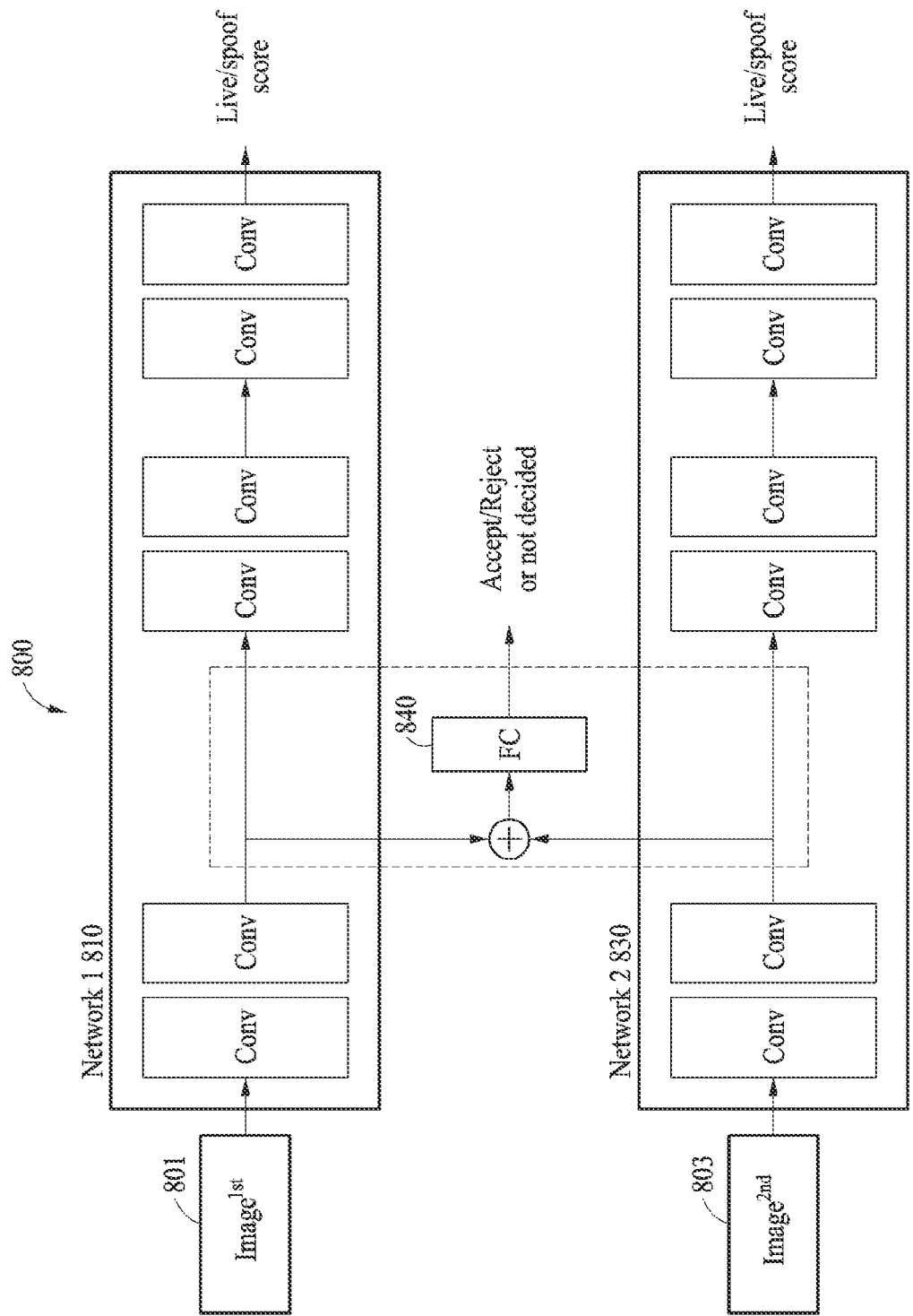

FIG. 8 illustrates another example of a network structure and an operation of an apparatus for detecting whether biometric information is spoofed. FIG. 8 illustrates a structure of a detection apparatus 800 configured to extract embedding vectors from two different images, for example, a first image 801 and a second image 803, and detect whether biometric information is spoofed. For example, the detection apparatus 800 may detect whether biometric information is spoofed, using dynamics between the first image 801 and the second image 803.

The detection apparatus 800 may determine whether biometric information is live information or spoof information, using intermediate layers of at least two networks, for example, a first neural network 810, and a second neural network 830. The first neural network 810 and the second neural network 830 may be, for example, CNNs (Conv).

When reliability is not ensured in a classifier 840 that classifies scores based on embedding vectors extracted from intermediate layers of the first neural network 810 and the second neural network 830, the detection apparatus 800 may defer the determination of first information regarding whether the biometric information is spoofed, and may determine second information regarding whether the biometric information is spoofed in an output process of the first neural network 810 and the second neural network 830. The classifier 840 may include, for example, a fully-connected (FC) layer, but is not limited thereto.

The detection apparatus 800 may extract at least one $(1-1)^{th}$ embedding vector from at least one first intermediate layer of the first neural network 810 that detects whether the biometric information is spoofed from the first image 801.

Also, the detection apparatus 800 may extract at least one $(1-2)^{th}$ embedding vector from at least one second intermediate layer of the second neural network 830 that detects whether the biometric information is spoofed from the second image 803.

The second image 803 may be, for example, an image obtained by capturing biometric information of a user at a different time from the first image 801, or an image generated by performing nonlinear image processing on the first image 801, but is not limited thereto. The image obtained by capturing the biometric information may be, for example, an image obtained in a matching process of verifying whether a user attempting authentication has the authority to access.

The detection apparatus 800 may calculate a $(1-3)^{th}$ score based on the $(1-1)^{th}$ embedding vector and the $(1-2)^{th}$ embedding vector, and may detect the first information regarding whether the biometric information is spoofed based on the $(1-3)^{th}$ score. The detection apparatus 800 may fuse or combine the $(1-1)^{th}$ embedding vector and the $(1-2)^{th}$ embedding vector to calculate the $(1-3)^{th}$ score. The detection apparatus 800 may detect the first information by classifying the $(1-3)^{th}$ score as a score in a range in which the biometric information is spoof information or a score in a range in which the biometric information is live information, using a trained $(1-3)^{th}$ classifier. In an example, when the first information is detected based on the $(1-3)^{th}$ score, the detection apparatus 800 may terminate an operation.

In another example, when the first information is not detected based on the $(1-3)^{th}$ score, the detection apparatus 800 may detect the second information regarding whether the biometric information is spoofed based on output vectors obtained from output layers of the first neural network 810 and the second neural network 830. For example, the detection apparatus 800 may obtain a first output vector from a first output layer of the first neural network 810. The detection apparatus 800 may obtain a second output vector from a second output layer of the second neural network 830. The detection apparatus 800 may detect the second information based on the first output vector and the second output vector. The detection apparatus 800 may detect the second information based on a third score that is based on the first output vector and the second output vector. The detection apparatus 800 may calculate the third score by assigning different weights to a score based on the first output vector and a score based on the second output vector.

Figure 9:
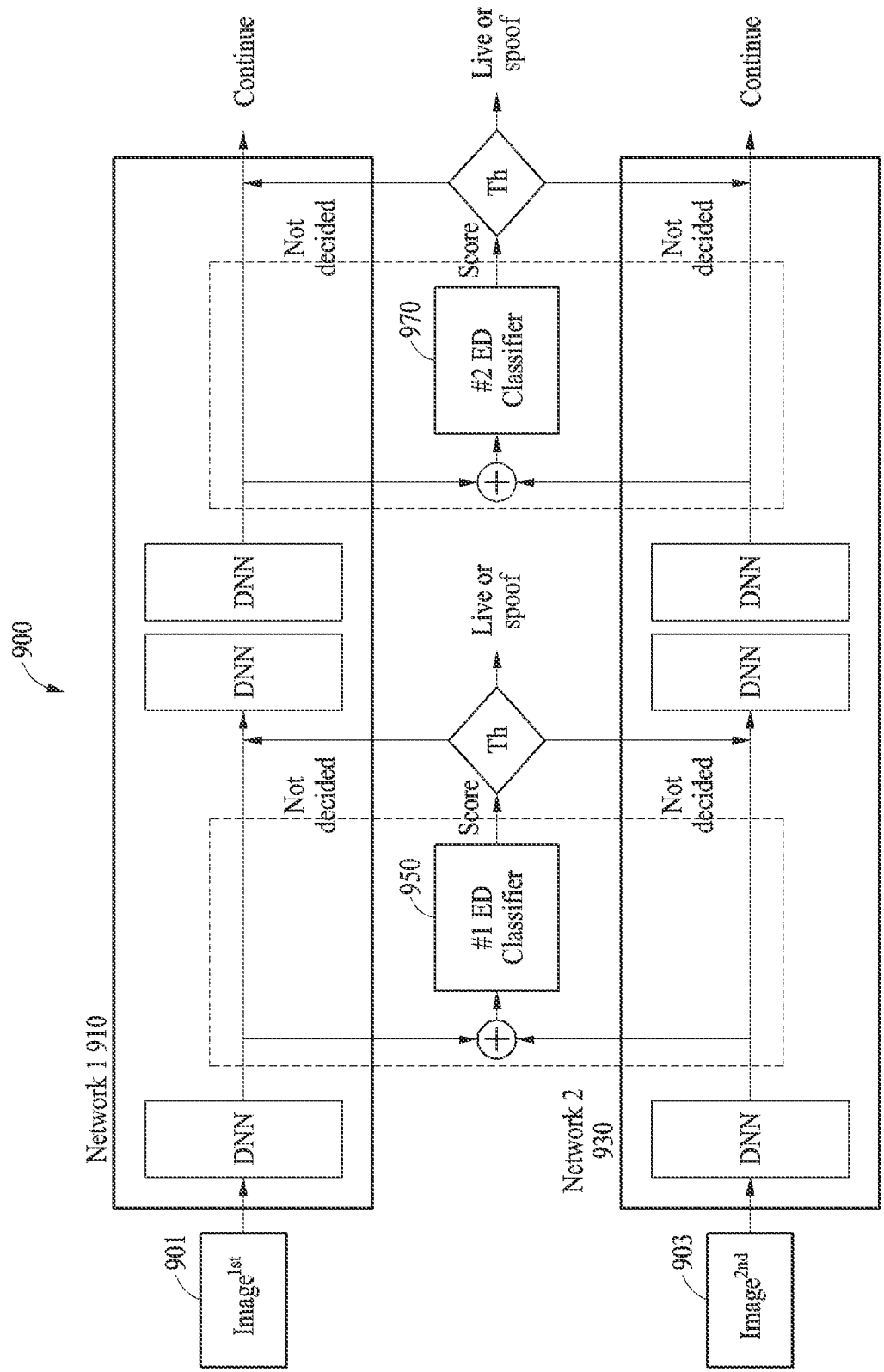

FIG. 9 illustrates another example of a network structure and an operation of an apparatus for detecting whether biometric information is spoofed. FIG. 9 illustrates a detection apparatus 900 configured to extract embedding vectors from two different images, for example, a first image 901 and a second image 903, and detect whether biometric information is spoofed.

The detection apparatus 900 may determine whether biometric information is live information or spoof information, using intermediate layers of at least two networks, for example, a first neural network 910, and a second neural network 930.

The detection apparatus 900 may extract at least one $(1\text{-}1)^{th}$ embedding vector from at least one first intermediate layer of the first neural network 910 that detects whether the biometric information is spoofed from the first image 901.

Also, the detection apparatus 900 may extract at least one $(1\text{-}2)^{th}$ embedding vector from at least one second intermediate layer of the second neural network 930 that detects whether the biometric information is spoofed from the second image 903. The second image 903 may be, for example, an image obtained by a sensor capturing biometric information of a user at a different time from the first image 901, or an image generated by performing image processing on the first image 901, but is not limited thereto.

The detection apparatus 900 may calculate a $(1\text{-}3)^{th}$ score by performing an element-wise sum of the $(1\text{-}1)^{th}$ embedding vector and the $(1\text{-}2)^{th}$ embedding vector, and may detect first information regarding whether the biometric information is spoofed based on the $(1\text{-}3)^{th}$ score. The detection apparatus 900 may determine whether the $(1\text{-}3)^{th}$ score is a score in a first threshold range Th for determining the first information, using a first classifier 950. When the $(1\text{-}3)^{th}$ score is determined as a score in the first threshold range Th, the detection apparatus 900 may detect the first information based on the $(1\text{-}3)^{th}$ score, and may terminate a subsequent operation.

When the $(1\text{-}3)^{th}$ score is determined as a score that is not in the first threshold range Th, the detection apparatus 900 may extract a new $(1\text{-}1)^{th}$ embedding vector from a subsequent intermediate layer of the first neural network 910 and extract a new $(1\text{-}2)^{th}$ embedding vector from a subsequent intermediate layer of the second neural network 930.

The detection apparatus 900 may calculate a new $(1\text{-}3)^{th}$ score by performing an element-wise sum of the $(1\text{-}1)^{th}$ embedding vector and the $(1\text{-}2)^{th}$ embedding vector extracted from the subsequent intermediate layers, and may detect the first information based on the new $(1\text{-}3)^{th}$ score. The detection apparatus 900 may determine whether the new $(1\text{-}3)^{th}$ score is a score in a first threshold range Th for determining the first information, using a second classifier 970. When the first information is detected based on the new $(1\text{-}3)^{th}$ score as a result of a classification of the second classifier 970, the detection apparatus 900 may terminate a subsequent operation.

When the first information is not detected based on the new $(1\text{-}3)^{th}$ score, the detection apparatus 900 may detect second information regarding whether the biometric information is spoofed based on output vectors obtained from output layers of the first neural network 910 and the second neural network 930.

The detection apparatus 900 may detect the second information using a first output vector of an output layer of the first neural network 910 and a second output vector of an output layer of the second neural network 930.

Figure 10:
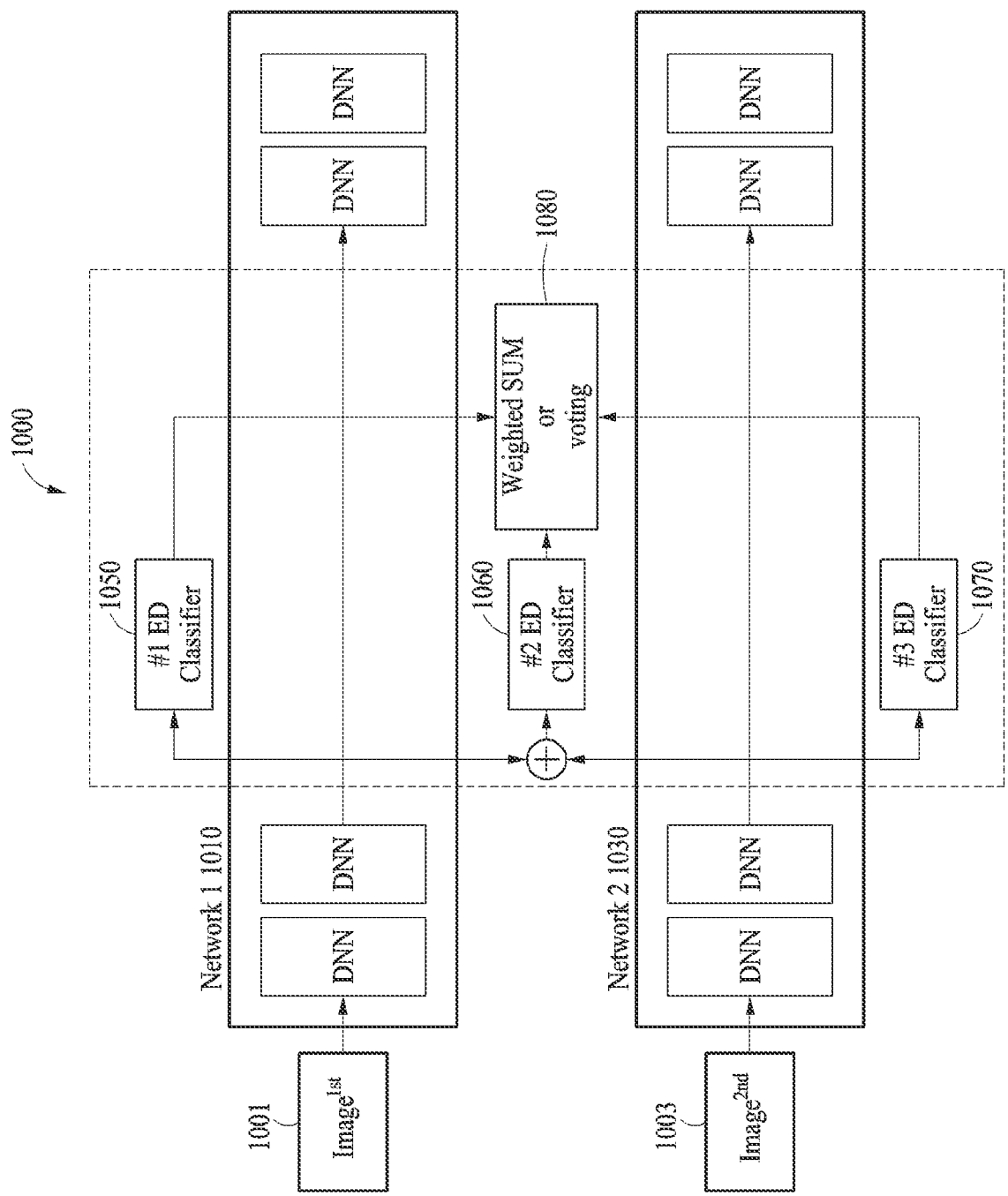

FIG. 10 illustrates another example of a network structure and an operation of an apparatus for detecting whether biometric information is spoofed. FIG. 10 illustrates a detection apparatus 1000 configured to detect whether biometric information is spoofed by combining results obtained by classifying embedding vectors extracted from two different images, for example, a first image 1001 and a second image 1003, using different classifiers, for example, a first classifier 1050, a second classifier 1060, and a third classifier 1070.

The detection apparatus 1000 may extract at least one $(1\text{-}1)^{th}$ embedding vector from at least one first intermediate layer of a first neural network 1010 that detects whether the biometric information is spoofed from the first image 1001.

The detection apparatus 1000 may extract at least one $(1\text{-}2)^{th}$ embedding vector from at least one second intermediate layer of a second neural network 1030 that detects whether the biometric information is spoofed from the second image 1003.

The detection apparatus 1000 may generate a $(1\text{-}3)^{th}$ embedding vector based on the $(1\text{-}1)^{th}$ embedding vector and the $(1\text{-}2)^{th}$ embedding vector. For example, the detection apparatus 1000 may simply combine the $(1\text{-}1)^{th}$ embedding vector and the $(1\text{-}2)^{th}$ embedding vector, or may perform an element-wise sum of the $(1\text{-}1)^{th}$ embedding vector and the $(1\text{-}2)^{th}$ embedding vector, to generate the $(1\text{-}3)^{th}$ embedding vector.

The detection apparatus 1000 may calculate a $(1\text{-}1)^{th}$ score based on the $(1\text{-}1)^{th}$ embedding vector, and calculate a $(1\text{-}2)^{th}$ score based on the $(1\text{-}2)^{th}$ embedding vector. Also, the detection apparatus 1000 may calculate a $(1\text{-}3)^{th}$ score based on the $(1\text{-}3)^{th}$ embedding vector.

The detection apparatus 1000 may detect first information regarding whether the biometric information is spoofed based on the $(1\text{-}1)^{th}$ score, the $(1\text{-}2)^{th}$ score and the $(1\text{-}3)^{th}$ score.

The detection apparatus 1000 may perform a $(1\text{-}1)^{th}$ classification of the $(1\text{-}1)^{th}$ score as a score in a range in which the biometric information is determined as spoof information or a score in a range in which the biometric information is determined as live information, using the first classifier 1050 (for example, a $(1\text{-}1)^{th}$ classifier) that is trained in advance.

The detection apparatus 1000 may perform a $(1\text{-}3)^{th}$ classification of the $(1\text{-}3)^{th}$ score as a score in the range in which the biometric information is determined as spoof information or a score in the range in which the biometric information is determined as live information, using the second classifier 1060 (for example, a $(1\text{-}3)^{th}$ classifier) that is trained in advance.

The detection apparatus 1000 may perform a $(1\text{-}2)^{th}$ classification of the $(1\text{-}2)^{th}$ score as a score in the range in which the biometric information is determined as spoof information or a score in the range in which the biometric information is determined as live information, using the third classifier 1070 (for example, a $(1\text{-}2)^{th}$ classifier) that is trained in advance.

The detection apparatus 1000 may detect the first information based on a result of a classification of each classifier, for example, a result of the $(1\text{-}1)^{th}$ classification, a result of the $(1\text{-}2)^{th}$ classification, and a result of the $(1\text{-}3)^{th}$ classification.

The detection apparatus 1000 may detect the first information by a weighted sum or majority voting 1080 of the result of the $(1\text{-}1)^{th}$ classification, the result of the $(1\text{-}2)^{th}$ classification, and the result of the $(1\text{-}3)^{th}$ classification. In an example, the detection apparatus 1000 may detect the first information by a weighted sum of the result of the $(1\text{-}1)^{th}$ classification, the result of the $(1\text{-}2)^{th}$ classification, and the result of the $(1\text{-}3)^{th}$ classification. Weights may be assigned to classification results according to the order of time in which an image is obtained. In this example, a highest weight, that is, a first weight may be assigned to the result of the $(1\text{-}1)^{th}$ classification corresponding to the first image 1001 that is most recently obtained, and a lowest weight, that is, a third weight may be assigned to the result of the $(1\text{-}2)^{th}$ classification corresponding to the second image 1003 that is obtained previously. Also, a second weight less than the first weight and greater than the third weight may be assigned to the result of the $(1\text{-}3)^{th}$ classification corresponding to the first image 1001 and the second image 1003.

In another example, the detection apparatus 1000 may detect the first information by majority voting of the result of the $(1\text{-}1)^{th}$ classification, the result of the $(1\text{-}2)^{th}$ classification, and the result of the $(1\text{-}3)^{th}$ classification. For example, the result of the $(1\text{-}1)^{th}$ classification may be assumed as spoof information and the result of the $(1\text{-}2)^{th}$ classification and the result of the $(1\text{-}3)^{th}$ classification may be assumed as live information. In this example, the detection apparatus 1000 may detect live information corresponding to a majority vote among one piece of spoof information and two pieces of live information as the first information. Thus, the detection apparatus 1000 may output the first information of the first image 1001 and the second image 1003 as "live information".

When it is difficult to detect the first information based on a classification result of each classifier, the detection apparatus 1000 may detect second information regarding whether the biometric information is spoofed based on a first output vector of an output layer of the first neural network 1010 and a second output vector of an output layer of the second neural network 1030.

Figure 11:
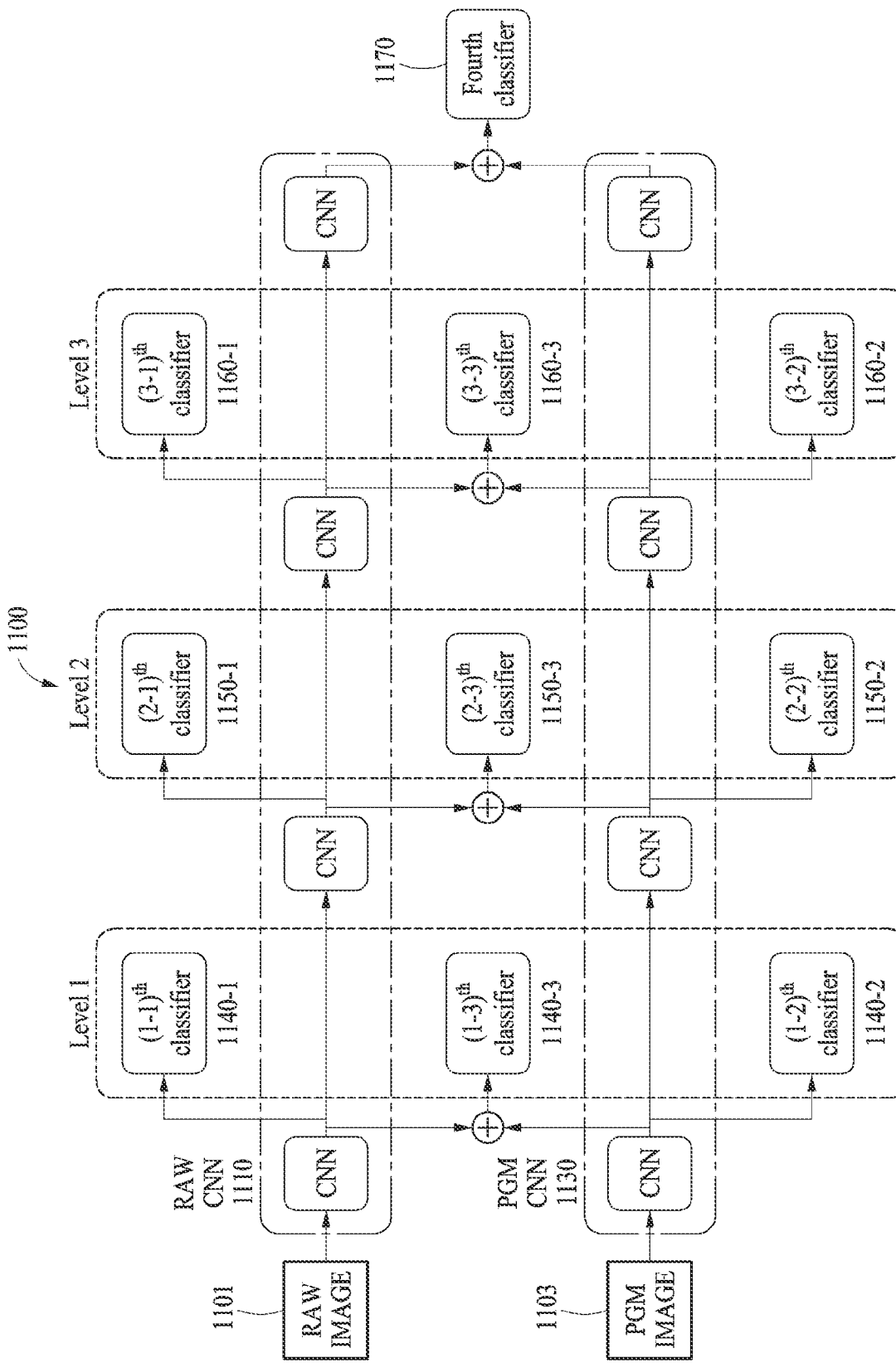

FIG. 11 illustrates another example of a network structure and an operation of an apparatus for detecting whether biometric information is spoofed. FIG. 11 illustrates a detection apparatus 1100 that uses three embedding vectors for each a first neural network 1110 and a second neural network 1130 and two images, for example, a first image 1101 and a second image 1103.

The first image 1101 may be, for example, an image corresponding to a raw input of a sensor, and the second image 1103 may be, for example, an image obtained by performing nonlinear image processing on the first image 1101. The nonlinear image processing may include, for example, removing noise of the first image 1101, and/or increasing a signal-to-noise ratio (SNR) of the first image 1101. The first image 1101 may be input to the first neural network 1110, and the second image 1103 may be input to the second neural network 1130.

The detection apparatus 1100 may operate by receiving embedding vectors extracted from intermediate layers of the first neural network 1110 and the second neural network 1130 for each image.

The detection apparatus 1100 may include a plurality of classifiers corresponding to each level, according to a level (position) of an intermediate layer of each neural network, from which an embedding vector is extracted. The level may be construed as including, for example, a layer, or an arrangement order of layers.

The detection apparatus 1100 may include a $(1\text{-}1)^{th}$ classifier 1140-1, a $(1\text{-}2)^{th}$ classifier 1140-2, and a $(1\text{-}3)^{th}$ classifier 1140-3 that correspond to a first level. The detection apparatus 1100 may include a $(2\text{-}1)^{th}$ classifier 1150-1, a $(2\text{-}2)^{th}$ classifier 1150-2, and a $(2\text{-}3)^{th}$ classifier 1150-3 that correspond to a second level. The detection apparatus 1100 may include a $(3\text{-}1)^{th}$ classifier 1160-1, a $(3\text{-}2)^{th}$ classifier 1160-2, and a $(3\text{-}3)^{th}$ classifier 1160-3 that correspond to a third level.

For example, the $(1\text{-}1)^{th}$ classifier 1140-1, the $(1\text{-}2)^{th}$ classifier 1140-2, and the $(1\text{-}3)^{th}$ classifier 1140-3 may operate by receiving scores based on embedding vectors extracted from first levels Level 1 of intermediate layers of the first neural network 1110 and the second neural network 1130. The $(1\text{-}1)^{th}$ classifier 1140-1 may classify biometric information corresponding to a $(1\text{-}1)^{th}$ score of a $(1\text{-}1)^{th}$ embedding vector extracted from the first level of the intermediate layer of the first neural network 1110 as live information or spoof information based on an accept threshold and a reject threshold. The $(1\text{-}2)^{th}$ classifier 1140-2 may classify biometric information corresponding to a $(1\text{-}2)^{th}$ score of a $(1\text{-}2)^{th}$ embedding vector extracted from the first level of the intermediate layer of the second neural network 1130 as live information or spoof information based on the accept threshold and the reject threshold.

The detection apparatus 1100 may generate a $(1\text{-}3)^{th}$ embedding vector based on the $(1\text{-}1)^{th}$ embedding vector and the $(1\text{-}2)^{th}$ embedding vector. For example, the detection apparatus 1100 may simply combine the $(1\text{-}1)^{th}$ embedding vector and the $(1\text{-}2)^{th}$ embedding vector, or may perform an element-wise sum of the $(1\text{-}1)^{th}$ embedding vector and the $(1\text{-}2)^{th}$ embedding vector, to generate the $(1\text{-}3)^{th}$ embedding vector. The $(1\text{-}3)^{th}$ classifier 1140-3 may classify biometric information corresponding to a $(1\text{-}3)^{th}$ score of the $(1\text{-}3)^{th}$ embedding vector as live information or spoof information based on the accept threshold and the reject threshold.

The detection apparatus 1100 may integrate classification results for the $(1\text{-}1)^{th}$ score, the $(1\text{-}2)^{th}$ score and the $(1\text{-}3)^{th}$ score, and may detect first information regarding whether the biometric information is detected at the first level. For example, the detection apparatus 1100 may detect the first information based on a classification result corresponding to a majority vote among the classification results for the $(1\text{-}1)^{th}$ score, the $(1\text{-}2)^{th}$ score and the $(1\text{-}3)^{th}$ score.

When the first information is detected at the first level, the detection apparatus 1100 may early terminate an operation instead of needing to perform a subsequent process. When the first information is not detected at the first level, the detection apparatus 1100 may detect the first information at a next level, for example, a second level.

The $(2\text{-}1)^{th}$ classifier 1150-1, the $(2\text{-}2)^{th}$ classifier 1150-2, and the $(2\text{-}3)^{th}$ classifier 1150-3 may operate by receiving scores of embedding vectors extracted from second levels Level 2 of the intermediate layers of the first neural network 1110 and the second neural network 1130. Similarly to the $(1\text{-}1)^{th}$ classifier 1140-1, the $(1\text{-}2)^{th}$ classifier 1140-2, and the $(1\text{-}3)^{th}$ classifier 1140-3, the $(2\text{-}1)^{th}$ classifier 1150-1, the $(2\text{-}2)^{th}$ classifier 1150-2, and the $(2\text{-}3)^{th}$ classifier 1150-3 may classify biometric information corresponding to a $(2\text{-}1)^{th}$ score of a $(2\text{-}1)^{th}$ embedding vector, a $(2\text{-}2)^{th}$ score of a $(2\text{-}2)^{th}$ embedding vector, and a $(2\text{-}3)^{th}$ score of a $(2\text{-}3)^{th}$ embedding vector as live information or spoof information based on the accept threshold and the reject threshold, respectively. The $(2\text{-}1)^{th}$ embedding vector, the $(2\text{-}2)^{th}$ embedding vector, and the $(2-3)^{th}$ embedding vector may be extracted from the second levels of the intermediate layers of the first neural network 1110 and the second neural network 1130. The detection apparatus 1100 may integrate classification results for the $(2-1)^{th}$ score, the $(2-2)^{th}$ score and the $(2-3)^{th}$ score, and may detect the first information at the second level. When the first information is detected at the second level, the detection apparatus 1100 may early terminate an operation instead of needing to perform a subsequent process. When the first information is not detected at the second level, the detection apparatus 1100 may detect the first information at a next level, for example, a third level.

The $(3-1)^{th}$ classifier 1160-1, the $(3-2)^{th}$ classifier 1160-2, and the $(3-3)^{th}$ classifier 1160-3 may operate by receiving scores of embedding vectors extracted from third levels Level 3 of the intermediate layers of the first neural network 1110 and the second neural network 1130.

Similarly to the $(2-1)^{th}$ classifier 1150-1, the $(2-2)^{th}$ classifier 1150-2, and the $(2-3)^{th}$ classifier 1150-3, the $(3-1)^{th}$ classifier 1160-1, the $(3-2)^{th}$ classifier 1160-2, and the $(3-3)^{th}$ classifier 1160-3 may classify biometric information corresponding to a $(3-1)^{th}$ score of a $(3-1)^{th}$ embedding vector, a $(3-2)^{th}$ score of a $(3-2)^{th}$ embedding vector, and a $(3-3)^{th}$ score of a $(3-3)^{th}$ embedding vector as live information or spoof information based on the accept threshold and the reject threshold, respectively. The $(3-1)^{th}$ embedding vector, the $(3-2)^{th}$ embedding vector, and the $(3-3)^{th}$ embedding vector may be extracted from the third levels of the intermediate layers of the first neural network 1110 and the second neural network 1130. The detection apparatus 1100 may integrate classification results for the $(3-1)^{th}$ score, the $(3-2)^{th}$ score and the $(3-3)^{th}$ score, and may detect the first information at the third level. When the first information is detected at the third level, the detection apparatus 1100 may early terminate an operation instead of needing to perform a subsequent process.

The $(1-1)^{th}$ classifier 1140-1 through the $(3-3)^{th}$ classifier 1160-3 that classify scores of embedding vectors extracted from the intermediate layers of the first neural network 1110 and the second neural network 1130 in the detection apparatus 1100 may be designed as a simple network, for example, the above-described shallow DNN. When whether the biometric information is live information or spoof information is clearly determined by the $(1-1)^{th}$ classifier 1140-1 through the $(3-3)^{th}$ classifier 1160-3 of each level, the detection apparatus 1100 may quickly determine the first information to enhance usability of the detection apparatus 1100. The detection apparatus 1100 may operate without lowering a speed due to a small overhead caused by an early decision (ED) in an intermediate layer even though the determination of the first information in the intermediate layer fails.

When the first information is not detected at the third level, the detection apparatus 1100 may detect second information regarding whether the biometric information is spoofed, based on a first output vector of an output layer of the first neural network 1110 and a second output vector of an output layer of the second neural network 1130. The detection apparatus 1100 may detect the second information by classifying scores based on the first output vector and the second output vector using a fourth classifier 1170.

In an example, the $(1-1)^{th}$ classifier 1140-1 through the $(3-3)^{th}$ classifier 1160-3 that detect the first information from the intermediate layers of the first neural network 1110 and the second neural network 1130, and the fourth classifier 1170 that detects the second information may be trained together, or separately.

Depending on examples, the first neural network 1110 and the second neural network 1130 may train a baseline based on a result of detection of the second information using the output vectors of the output layers, instead of using the embedding vectors of the intermediate layers. Subsequently, the baseline may be fixed to prevent the baseline from being trained, and the $(1-1)^{th}$ classifier 1140-1 through the $(3-3)^{th}$ classifier 1160-3 that extract embedding vectors from the fixed baseline and that detect the first information from the intermediate layers using the extracted embedding vectors may be trained. Thus, a result of the baseline may not be affected by the $(1-1)^{th}$ classifier 1140-1 through the $(3-3)^{th}$ classifier 1160-3 that detect the first information.

Figure 12:
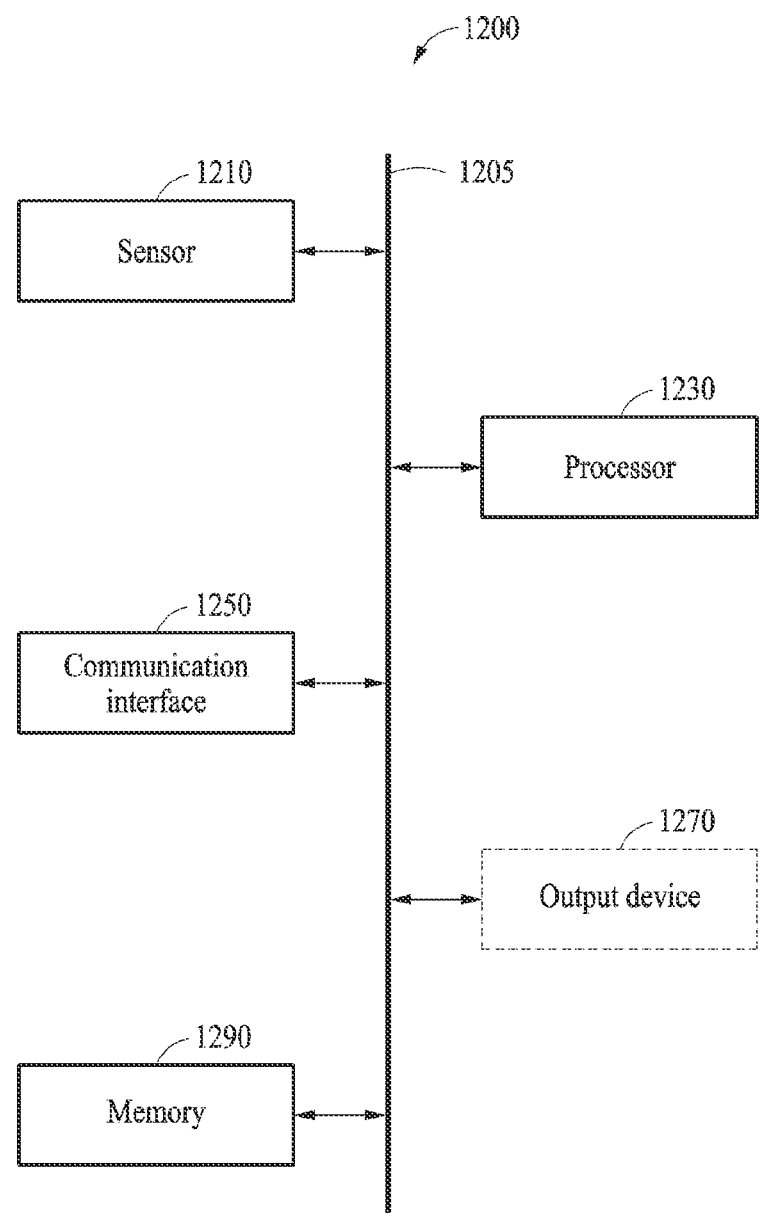
FIG. 12 illustrates an example of an apparatus for detecting whether biometric information is spoofed.

FIG. 12 illustrates an example of an apparatus for detecting whether biometric information is spoofed. Referring to FIG. 12, a detection apparatus 1200 may include a sensor 1210 (e.g., one or more sensors), a processor 1230 (e.g., one or more processors), the communication interface 1250, an output device 1270, and the memory 1290 (e.g., one or more memories). The sensor 1210, the processor 1230, the communication interface 1250, the output device 1270, and the memory 1290 may be connected to each other via a communication bus 1205.

The sensor 1210 may capture an image including biometric information of a user. The sensor 1210 may include, for example, any one or any combination of an ultrasonic fingerprint sensor, an optical fingerprint sensor, an electrostatic fingerprint sensor, a depth sensor, and an image sensor, but is not limited thereto. The biometric information may include, for example, one of a fingerprint, an iris, and a face of a user, but is not limited thereto.

The processor 1230 may extract an embedding vector from an intermediate layer of a neural network configured to detect whether the biometric information is spoofed from the image captured by the sensor 1210. The processor 1230 may detect first information regarding whether the biometric information is spoofed, based on the embedding vector. The processor 1230 may detect second information regarding whether the biometric information is spoofed based on whether the first information is detected, using an output vector output from an output layer of the neural network. However, the operation of the processor 1230 is not limited thereto. For example, the processor 1230 may also perform the above operations together with at least one of the operations described above with reference to FIGS. 1 to 11.

The processor 1230 may be a neural network or a detection apparatus implemented by hardware including a circuit having a physical structure to perform desired operations. In an example, the desired operations may include instructions or codes included in a program. For example, the hardware-implemented detection apparatus may include a microprocessor, a central processing unit (CPU), a graphics processing unit (GPU), a processor core, a multi-core processor, a multiprocessor, an application-specific integrated circuit (ASIC), a field-programmable gate array (FPGA), and a neural processing unit (NPU).

The processor 1230 may execute the program and may control the detection apparatus 1200. Code of the program executed by the processor 1230 may be stored in the memory 1290.

The communication interface 1250 may output information (for example, the first information and/or the second information) regarding whether the biometric information is spoofed, detected by the processor 1230 to the outside of the detection apparatus 1200. In an example, the communication interface 1250 may transmit the biometric information together with the information regarding whether the biometric information is spoofed, detected by the processor 1230 to another apparatus. In this example, the biometric information and the information regarding whether the biometric information is spoofed may be matched with each other.

Depending on examples, the communication interface 1250 may receive an image obtained by capturing biometric information of a user from the outside of the detection apparatus 1200 and may transfer the image to the processor 1230.

The output device 1270 may output the information regarding whether the biometric information is spoofed, detected by the processor 1230. The output device 1270 may include, for example, a display, an alarm, a speaker, or other various types of output devices for informing the user of whether the biometric information is spoofed.

The memory 1290 may store the biometric information of the user sensed by the sensor 1210, that is, a static feature related to the biometric information of the user, and images obtained by capturing the biometric information. Also, the memory 1290 may store first feature information and/or second feature information obtained by the processor 1230. The memory 1290 may store a first score, a second score, and a fused score calculated by the processor 1230. In addition, the memory 1290 may store the biometric information and the information regarding whether the biometric information is spoofed, detected by the processor 1230, by matching them to each other.

Also, the memory 1290 may store a variety of information generated in a processing process of the processor 1230 described above. In addition, the memory 1290 may store a variety of data and programs. The memory 1290 may include, for example, a volatile memory or a non-volatile memory. The memory 1290 may include a large-capacity storage medium such as a hard disk to store a variety of data.

Figure 13:
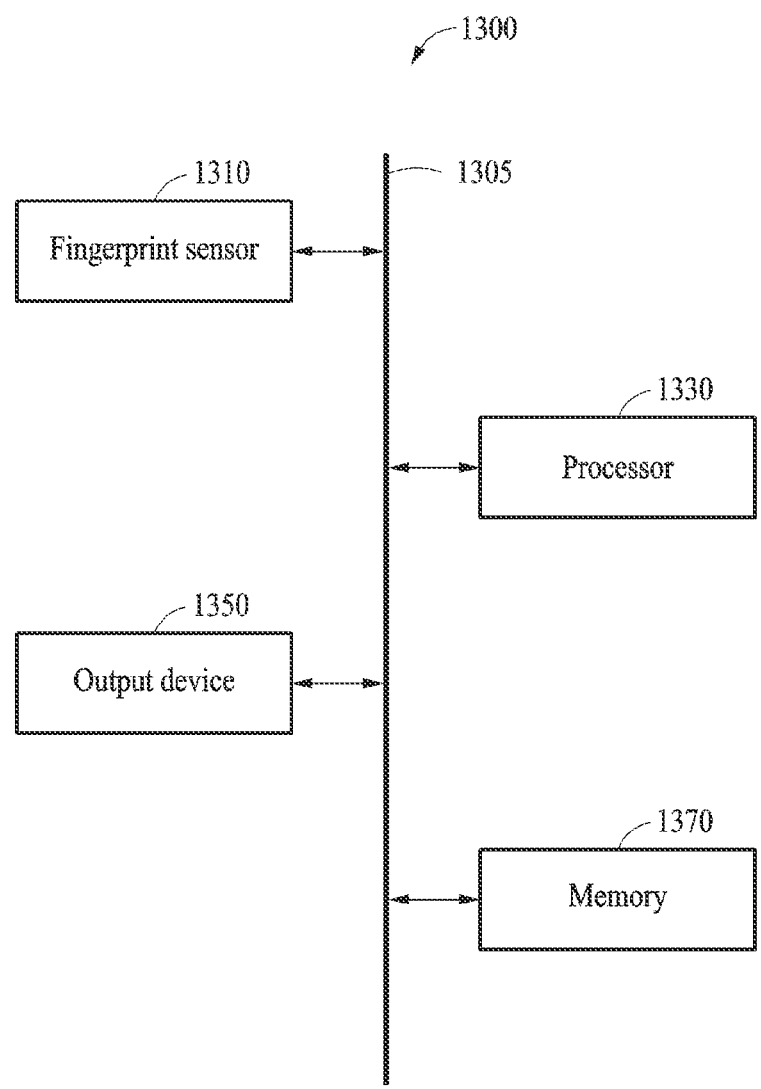
FIG. 13 illustrates an example of an electronic device.

FIG. 13 illustrates an example of an electronic device. Referring to FIG. 13, an electronic device 1300 may include a fingerprint sensor 1310 (e.g., one or more fingerprint sensors), a processor 1330 (e.g., one or more processors), an output device 1350, and a memory 1370 (e.g., one or more memories). The fingerprint sensor 1310, the processor 1330, the output device 1350, and the memory 1370 may be connected to each other via a communication bus 1305.

The fingerprint sensor 1310 may capture an image including fingerprint information of a user. The fingerprint sensor 1310 may include, for example, any one or any combination of an ultrasonic fingerprint sensor, an optical fingerprint sensor, and an electrostatic fingerprint sensor. A single fingerprint sensor 1310, or a plurality of fingerprint sensors 1310 may be included.

The processor 1330 may extract at least one embedding from an intermediate layer of a neural network configured to detect whether the fingerprint information is spoofed from the image captured by the fingerprint sensor 1310. The processor 1330 may detect first information regarding whether the fingerprint information is spoofed, based on the at least one embedding vector. The processor 1330 may detect second information regarding whether the fingerprint information is spoofed, based on whether the first information is detected, using an output vector output from an output layer of the neural network. However, the operation of the processor 1330 is not limited thereto. For example, the processor 1330 may perform the above operation together with at least one of the operations described above with reference to FIGS. 1 to 12.

The output device 1350 may output at least one of the first information and the second information detected by the processor 1330. The output device 1350 may output whether the fingerprint information is spoofed to the inside or outside of the electronic device 1300. The output device 1350 may include, for example, a display, an alarm, a speaker, or other various types of output devices for informing the user of whether the fingerprint information is spoofed.

The memory 1370 may store images including the fingerprint information of the user captured by the fingerprint sensor 1310. Also, the memory 1370 may store the output vector and/or the embedding vector extracted by the processor 1330. The memory 1370 may store the fingerprint information and information regarding whether the fingerprint information is spoofed, detected by the processor 1330, by matching them to each other.

Also, the memory 1370 may store a variety of information generated in a processing process of the processor 1330 described above. In addition, the memory 1370 may store a variety of data and programs. The memory 1370 may include, for example, a volatile memory or a non-volatile memory. The memory 1370 may include a large-capacity storage medium such as a hard disk to store a variety of data.

The detection apparatuses, sensors, enrolled fingerprint DBs, $(1-1)^{th}$ classifiers, $(1-2)^{th}$ classifiers, second classifiers, classifiers, first classifiers, third classifiers, $(1-3)^{th}$ classifiers, $(2-1)^{th}$ classifiers, $(2-2)^{th}$ classifiers, $(2-3)^{th}$ classifiers, $(3-1)^{th}$ classifiers, $(3-2)^{th}$ classifiers, $(3-3)^{th}$ classifiers, fourth classifiers, processors, communication interfaces, output devices, memories, communication buses, electronic devices, fingerprint sensors, detection apparatus 100, sensor 110, enrolled fingerprint DB 120, detection apparatus 400, $(1-1)^{th}$ classifier 440, $(1-2)^{th}$ classifier 450, second classifier 460, detection apparatus 700, $(1-1)^{th}$ classifier 720, $(1-2)^{th}$ classifier 730, second classifier 740, detection apparatus 800, classifier 840, detection apparatus 900, first classifier 950, second classifier 970, detection apparatus 1000, first classifier 1050, second classifier 1060, third classifier 1070, detection apparatus 1100, $(1-1)^{th}$ classifier 1140-1, $(1-2)^{th}$ classifier 1140-2, $(1-3)^{th}$ classifier 1140-3, $(2-1)^{th}$ classifier 1150-1, $(2-2)^{th}$ classifier 1150-2, $(2-3)^{th}$ classifier 1150-3, $(3-1)^{th}$ classifier 1160-1, $(3-2)^{th}$ classifier 1160-2, $(3-3)^{th}$ classifier 1160-3, fourth classifier 1170, detection apparatus 1200, sensor 1210, processor 1230, communication interface 1250, output device 1270, memory 1290, communication bus 1205, electronic device 1300, fingerprint sensor 1310, processor 1330, output device 1350, memory 1370, communication bus 1305, and other apparatuses, units, modules, devices, and components described herein with respect to FIGS. 1-13 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A method with biometric information spoof detection, the method comprising:
   extracting an embedding vector from an intermediate layer of a neural network configured to detect whether biometric information of a user is spoofed from an image including the biometric information;
   detecting for first information indicating that the biometric information is spoofed, based on the embedding vector; and
   selectively, dependent on whether the first information is detected in the detecting for the first information, detecting second information regarding whether the biometric information is spoofed using an output vector output from an output layer of the neural network,
   wherein the detecting for the first information comprises:
      calculating a first score based on the embedding vector;

determining whether the first score is in a first threshold range; and detecting the first information based on the first score dependent on a result of the determining being that the first score is the score in the first threshold range.

2. The method of claim 1, wherein the first threshold range is based on
   a first threshold corresponding to a maximum probability that the first score represents a score corresponding to spoof information, and
   a second threshold corresponding to a minimum probability that the first score represents a score corresponding to live information.

3. The method of claim 1, wherein the determining comprises classifying, using a trained classifier, the first score as either one of
   in the first threshold range, and
   in a range indicating that the biometric information is live information.

4. The method of claim 3, wherein the classifying further comprises outputting a classification result of the classifier.

5. The method of claim 1, wherein the detecting for the first information further comprises, dependent on the result of the determining that the first score is not in the first threshold range:
   extracting a $(1\text{-}2)^{th}$ embedding vector from another intermediate layer subsequent to the intermediate layer;
   calculating a $(1\text{-}2)^{th}$ score based on the $(1\text{-}2)^{th}$ embedding vector; and
   detecting the first information in response to the $(1\text{-}2)^{th}$ score meeting a second information criterion.

6. The method of claim 5, wherein the detecting of the first information in response to the $(1\text{-}2)^{th}$ score meeting the second information criterion comprises classifying, using a trained $(1\text{-}2)^{th}$ classifier, the $(1\text{-}2)^{th}$ score as either one of
   a score in a range indicating that the biometric information is spoof information, and
   another score in another range indicating that the biometric information is live information.

7. The method of claim 1, wherein the detecting of the second information comprises detecting the second information based on a second score that is based on the output vector.

8. The method of claim 1, wherein the image comprises a first image and a second image including the biometric information of the user, and
   the extracting of the embedding vector comprises:
      extracting at least one $(1\text{-}1)^{th}$ embedding vector from at least one first intermediate layer of a first neural network configured to detect whether the biometric information is detected from the first image; and
      extracting at least one $(1\text{-}2)^{th}$ embedding vector from at least one second intermediate layer of a second neural network configured to detect whether the biometric information is detected from the second image.

9. The method of claim 8, wherein the second image comprises either one of
   an image acquired by capturing the biometric information of the user at a different time from the first image using a sensor, and
   an image generated through image processing of the first image.

10. The method of claim 8, wherein the detecting for the first information comprises:
    calculating a $(1\text{-}3)^{th}$ score based on the $(1\text{-}1)^{th}$ embedding vector and the $(1\text{-}2)^{th}$ embedding vector; and
    detecting the first information based in response to the $(1\text{-}3)^{th}$ score meeting a first information criterion.

11. The method of claim 10, wherein the detecting of the second information comprises, dependent on the $(1\text{-}3)^{th}$ score not meeting the first information criterion:
    obtaining a first output vector from a first output layer of the first neural network;
    obtaining a second output vector from a second output layer of the second neural network; and
    detecting the second information based on the first output vector and the second output vector.

12. The method of claim 11, wherein the detecting of the second information based on the first output vector and the second output vector comprises detecting the second information based on a third score that is based on the first output vector and the second output vector.

13. The method of claim 8, further comprising:
    generating a $(1\text{-}3)^{th}$ embedding vector based on the $(1\text{-}1)^{th}$ embedding vector and the $(1\text{-}2)^{th}$ embedding vector; and
    calculating a $(1\text{-}3)^{th}$ score based on the $(1\text{-}3)^{th}$ embedding vector,
    wherein the detecting for the first information comprises detecting for the first information based on a $(1\text{-}1)^{th}$ score calculated based on the $(1\text{-}1)^{th}$ embedding vector, a $(1\text{-}2)^{th}$ score calculated based on the $(1\text{-}2)^{th}$ embedding vector, and the $(1\text{-}3)^{th}$ score.

14. The method of claim 13, wherein the generating of the $(1\text{-}3)^{th}$ embedding vector comprises either one of:
    combining the $(1\text{-}1)^{th}$ embedding vector and the $(1\text{-}2)^{th}$ embedding vector to generate the $(1\text{-}3)^{th}$ embedding vector; and
    performing an element-wise sum of the $(1\text{-}1)^{th}$ embedding vector and the $(1\text{-}2)^{th}$ embedding vector to generate the $(1\text{-}3)^{th}$ embedding vector.

15. The method of claim 13, wherein the detecting for the first information comprises:
    performing a $(1\text{-}1)^{th}$ classification of the $(1\text{-}1)^{th}$ score as a score in a range in which the biometric information is determined as spoof information or a score in a range in which the biometric information is determined as live information, using a trained $(1\text{-}1)^{th}$ classifier;
    performing a $(1\text{-}2)^{th}$ classification of the $(1\text{-}2)^{th}$ score as a score in the range in which the biometric information is determined as the spoof information or a score in the range in which the biometric information is determined as the live information, using a trained $(1\text{-}2)^{th}$ classifier;
    performing a $(1\text{-}3)^{th}$ classification of the $(1\text{-}3)^{th}$ score as a score in the range in which the biometric information is determined as the spoof information or a score in the range in which the biometric information is determined as the live information, using a trained $(1\text{-}3)^{th}$ classifier; and
    detecting for the first information based on a result of the $(1\text{-}1)^{th}$ classification, a result of the $(1\text{-}2)^{th}$ classification, and a result of the $(1\text{-}3)^{th}$ classification.

16. The method of claim 15, wherein the detecting for the first information based on the result of the $(1\text{-}1)^{th}$ classification, the result of the $(1\text{-}2)^{th}$ classification, and the result of the $(1\text{-}3)^{th}$ classification comprises detecting for the first information based on a weighted sum of the result of the $(1\text{-}1)^{th}$ classification, the result of the $(1\text{-}2)^{th}$ classification, and the result of the $(1\text{-}3)^{th}$ classification.

17. The method of claim 15, wherein the detecting for the first information based on the result of the $(1\text{-}1)^{th}$ classification, the result of the $(1\text{-}2)^{th}$ classification, and the result of the $(1\text{-}3)^{th}$ classification comprises detecting for the first information using majority voting of the result of the $(1-1)^{th}$ classification, the result of the $(1-2)^{th}$ classification, and the result of the $(1-3)^{th}$ classification.

18. The method of claim 1, wherein the biometric information comprises any one of a fingerprint, an iris, and a face of the user.

19. The method of claim 1, wherein the detecting for the first information further comprises, in response to the result of the determining being that the first score is not in the first threshold range:
   extracting a $(1-2)^{th}$ embedding vector from another intermediate layer subsequent to the intermediate layer;
   calculating a $(1-2)^{th}$ score based on the $(1-2)^{th}$ embedding vector;
   fusing the first score and the $(1-2)^{th}$ score; and
   selectively detecting the first information by classifying the fused score as either one of a score in a range that indicates the biometric information is spoof information and another score in another range that indicates the biometric information is live information.

20. A method with biometric information spoof detection, the method comprising:
   extracting an embedding vector from an intermediate layer of a neural network configured to detect whether biometric information of a user is spoofed from an image including the biometric information;
   detecting for first information regarding whether the biometric information is spoofed based on a first score that is calculated based on the embedding vector; and
   dependent on the first information not being detected in the detecting for the first information:
      extracting a $(1-2)^{th}$ embedding vector from another intermediate layer subsequent to the intermediate layer;
      calculating a $(1-2)^{th}$ score based on the $(1-2)^{th}$ embedding vector;
      fusing the first score and the $(1-2)^{th}$ score; and
      detecting the first information by classifying the fused score as either one of a score in a range in which the biometric information is determined as spoof information and a score in a range in which the biometric information is determined as live information.

21. A non-transitory computer-readable storage medium storing instructions that, when executed by a processor, configure the processor to perform the method of claim 1.

22. An apparatus with biometric information spoof detection, the apparatus comprising:
   a sensor configured to capture an image including biometric information of a user; and
   a processor configured to:
      extract an embedding vector from an intermediate layer of a neural network configured to detect whether the biometric information is spoofed from the image;
      detect for first information indicating that the biometric information is spoofed, based on the embedding vector; and
      selectively, dependent on whether the first information is detected in the detecting for the first information, detect second information regarding whether the biometric information is spoofed using an output vector output from an output layer of the neural network
   wherein, for the detecting for the first information, the processor is configured to:
      calculate a first score based on the embedding vector;
      determine whether the first score is in a first threshold range; and
      detecting the first information based on the first score dependent on a result of the determining being that the first score is the score in the first threshold range.

23. The apparatus of claim 22, wherein the first threshold range is based on:
   a first threshold corresponding to a maximum probability that the first score represents a score corresponding to spoof information; and
   a second threshold corresponding to a minimum probability that the first score represents a score corresponding to live information.

24. The apparatus of claim 22, wherein, for the determination, the processor is configured to classify, using a trained classifier, the first score as either one of:
   in the first threshold range; and
   in a range indicating that the biometric information is live information.

25. The apparatus of claim 24, wherein the processor is further configured to output a classification result of the classifier.

26. The apparatus of claim 22, wherein, for the detecting for the first information, the processor is configured to, dependent on the result of the determination being that the first score is not in the first threshold range:
   extract a $(1-2)^{th}$ embedding vector from another intermediate layer subsequent to the intermediate layer;
   calculate a $(1-2)^{th}$ score based on the $(1-2)^{th}$ embedding vector; and
   detect the first information in response to the $(1-2)^{th}$ score meeting a second information criterion.

27. The apparatus of claim 26, wherein, for the detecting of the first information in response to the $(1-2)^{th}$ score meeting the second information criterion, the processor is configured to classify, using a trained $(1-2)^{th}$ classifier, the $(1-2)^{th}$ score as either one of:
   a score in a range indicating that the biometric information is spoof information; and
   another score in another range indicating that the biometric information is live information.

28. The apparatus of claim 22, wherein the processor is further configured to, dependent on the result of the determination being that the first score is not in the first threshold range:
   extract a $(1-2)^{th}$ embedding vector from another intermediate layer subsequent to the intermediate layer;
   calculate a $(1-2)^{th}$ score based on the $(1-2)^{th}$ embedding vector;
   fuse the first score and the $(1-2)^{th}$ score; and
   selectively detect the first information by classifying the fused score as either one of a score in a range indicating that the biometric information is spoof information and another score in another range indicating the biometric information is live information.

29. The apparatus of claim 22, wherein, for the detecting of the second information, the processor is configured to detect the second information based on a second score that is based on the output vector.

30. The apparatus of claim 22,
   wherein the image comprises a first image and a second image including the biometric information of the user, and
   for the extracting of the embedding vector, the processor is configured to:
      extract at least one $(1-1)^{th}$ embedding vector from at least one first intermediate layer of a first neural network configured to detect whether the biometric information is detected from the first image; and extract at least one $(1\text{-}2)^{th}$ embedding vector from at least one second intermediate layer of a second neural network configured to detect whether the biometric information is detected from the second image.

31. The apparatus of claim 30, wherein the second image comprises either one of:
an image acquired by capturing the biometric information of the user at a different time from the first image using a sensor; and
an image generated through image processing of the first image.

32. The apparatus of claim 30, wherein, for the detecting for the first information, the processor is configured to:
calculate a $(1\text{-}3)^{th}$ score based on the $(1\text{-}1)^{th}$ embedding vector and the $(1\text{-}2)^{th}$ embedding vector; and
detect the first information in response to the $(1\text{-}3)^{th}$ score meeting a first information criterion.

33. The apparatus of claim 32, wherein, for the detecting of the second information, the processor is configured to, dependent on the $(1\text{-}3)^{th}$ score not meeting the first information criterion:
obtain a first output vector from a first output layer of the first neural network;
obtain a second output vector from a second output layer of the second neural network; and
detect the second information based on the first output vector and the second output vector.

34. The apparatus of claim 33, wherein, for the detecting of the second information based on the first output vector and the second output vector, the processor is configured to detect the second information based on a third score that is based on the first output vector and the second output vector.

35. The apparatus of claim 30, wherein, for the detecting for the first information, the processor is further configured to:
generate a $(1\text{-}3)^{th}$ embedding vector based on the $(1\text{-}1)^{th}$ embedding vector and the $(1\text{-}2)^{th}$ embedding vector;
calculate a $(1\text{-}3)^{th}$ score based on the $(1\text{-}3)^{th}$ embedding vector; and
detect for the first information based on a $(1\text{-}1)^{th}$ score calculated based on the $(1\text{-}1)^{th}$ embedding vector, a $(1\text{-}2)^{th}$ score calculated based on the $(1\text{-}2)^{th}$ embedding vector, and the $(1\text{-}3)^{th}$ score.

36. The apparatus of claim 35, wherein the processor is configured to generate the $(1\text{-}3)^{th}$ embedding vector by either one of:
combining the $(1\text{-}1)^{th}$ embedding vector and the $(1\text{-}2)^{th}$ embedding vector; and
performing an element-wise sum of the $(1\text{-}1)^{th}$ embedding vector and the $(1\text{-}2)^{th}$ embedding vector.

37. The apparatus of claim 35, wherein, for the detecting for the first information, the processor is configured to:
perform a $(1\text{-}1)^{th}$ classification of the $(1\text{-}1)^{th}$ score as a score in a range in which the biometric information is determined as spoof information or a score in a range in which the biometric information is determined as live information, using a trained $(1\text{-}1)^{th}$ classifier;
perform a $(1\text{-}2)^{th}$ classification of the $(1\text{-}2)^{th}$ score as a score in the range in which the biometric information is determined as the spoof information or a score in the range in which the biometric information is determined as the live information, using a trained $(1\text{-}2)^{th}$ classifier;
perform a $(1\text{-}3)^{th}$ classification of the $(1\text{-}3)^{th}$ score as a score in the range in which the biometric information is determined as the spoof information or a score in the range in which the biometric information is determined as the live information, using a trained $(1\text{-}3)^{th}$ classifier; and
detect for the first information based on a result of the $(1\text{-}1)^{th}$ classification, a result of the $(1\text{-}2)^{th}$ classification, and a result of the $(1\text{-}3)^{th}$ classification.

38. The apparatus of claim 37, wherein, for the detecting for the first information based on the result of the $(1\text{-}1)^{th}$ classification, the result of the $(1\text{-}2)^{th}$ classification, and the result of the $(1\text{-}3)^{th}$ classification, the processor is configured to detect for the first information by a weighted sum of the result of the $(1\text{-}1)^{th}$ classification, the result of the $(1\text{-}2)^{th}$ classification, and the result of the $(1\text{-}3)^{th}$ classification.

39. The apparatus of claim 37, wherein, for the detecting for the first information based on the result of the $(1\text{-}1)^{th}$ classification, the result of the $(1\text{-}2)^{th}$ classification, and the result of the $(1\text{-}3)^{th}$ classification, the processor is configured to detect for the first information using majority voting of the result of the $(1\text{-}1)^{th}$ classification, the result of the $(1\text{-}2)^{th}$ classification, and the result of the $(1\text{-}3)^{th}$ classification.

40. An electronic device comprising:
a fingerprint sensor configured to capture an image including fingerprint information of a user;
a processor configured to:
extract at least one embedding vector from an intermediate layer of a neural network configured to detect whether the fingerprint information is spoofed from the image;
detect for first information indicating that the fingerprint information is spoofed, based on the at least one embedding vector; and
selectively, dependent on whether the first information is detected in the detecting for the first information, detect second information regarding whether the fingerprint information is spoofed, using an output vector output from an output layer of the neural network; and
an output device configured to output at least one of the first information and the second information,
wherein the image comprises a first image and a second image including the fingerprint information of the user, and
the extracting of the embedding vector comprises:
extracting at least one $(1\text{-}1)^{th}$ embedding vector from at least one first intermediate layer of a first neural network configured to detect whether the biometric information is detected from the first image; and
extracting at least one $(1\text{-}2)^{th}$ embedding vector from at least one second intermediate layer of a second neural network configured to detect whether the biometric information is detected from the second image.

41. The electronic device of claim 40, wherein the fingerprint sensor comprises any one or any combination of an ultrasonic fingerprint sensor, an optical fingerprint sensor, and an electrostatic fingerprint sensor.

42. A method with biometric information spoof detection, the method comprising:
determining either one or both of a first vector of a layer and a second vector of another layer of a neural network, based on biometric information;
calculating a score based on the first vector; and
performing a spoof detection based on a selected, based on a determination of whether the score is within a predetermined range, one of the first vector or the second vector, wherein the first vector is an embedding vector of an intermediate layer of the neural network and the second vector is an output vector of an output layer of the neural network, wherein the performing of the spoof detection comprises:
  performing the spoof detection based on the embedding vector, in response to the score being within the predetermined range, and
  performing the spoof detection based on the output vector, in response to the score being outside the predetermined range, and wherein the neural network is a deep neural network, and the performing of the spoof detection based on the embedding vector comprises using a shallow neural network.

43. The method of claim 42, wherein the predetermined range comprises a range above a first threshold and a range below a second threshold, and the first threshold is greater than the second threshold.

\* \* \* \* \*